US007844713B2

(12) United States Patent
Ikawa et al.

(10) Patent No.: US 7,844,713 B2
(45) Date of Patent: Nov. 30, 2010

(54) LOAD BALANCING METHOD AND SYSTEM

(75) Inventors: Naoki Ikawa, Kamakura (JP); Tetsuya Hashimoto, Tokyo (JP); Kosuke Shindo, Yokohama (JP)

(73) Assignee: Hitachi, Ltd., Tokyo (JP)

(*) Notice: Subject to any disclaimer, the term of this patent is extended or adjusted under 35 U.S.C. 154(b) by 458 days.

(21) Appl. No.: 11/622,628

(22) Filed: Jan. 12, 2007

(65) Prior Publication Data

US 2007/0198721 A1 Aug. 23, 2007

(30) Foreign Application Priority Data

Feb. 20, 2006 (JP) ............................ 2006-041810

(51) Int. Cl.
*G06F 15/16* (2006.01)

(52) U.S. Cl. .................. 709/227; 709/217; 709/220; 709/222; 709/223; 709/229

(58) Field of Classification Search .............. 709/217, 709/220, 222, 223, 227, 229
See application file for complete search history.

(56) References Cited

U.S. PATENT DOCUMENTS

| | | | |
|---|---|---|---|
| 6,098,093 A | 8/2000 | Bayeh et al. | |
| 6,473,802 B2 | 10/2002 | Masters | |
| 2002/0194342 A1* | 12/2002 | Lu et al. | 709/227 |
| 2003/0195984 A1* | 10/2003 | Zisapel et al. | 709/238 |
| 2004/0103194 A1* | 5/2004 | Islam et al. | 709/225 |
| 2005/0055435 A1* | 3/2005 | Gbadegesin et al. | 709/224 |
| 2006/0031374 A1* | 2/2006 | Lu et al. | 709/207 |
| 2006/0155862 A1* | 7/2006 | Kathi et al. | 709/229 |

FOREIGN PATENT DOCUMENTS

| | | |
|---|---|---|
| JP | 05-303549 | 11/1993 |
| JP | 2003-122732 A | 4/2003 |
| JP | 2003-296211 | 10/2003 |
| JP | 2004-178286 | 6/2004 |
| JP | 2005-70952 A | 3/2005 |
| JP | 2005-258757 | 9/2005 |
| JP | 2007-507762 A | 3/2007 |
| WO | 2005/018203 A1 | 2/2005 |

OTHER PUBLICATIONS

"BEA WebLogic Server Administration Kit" by Scott Hawkins, pp. 78-79, 2002.
Implementing Distributed Server Groups for the World Wide Web, Michael Garland, et al., Jan. 25, 1995., pp. 1-10.
"Load Balancing Servers, Firewalls, and Caches" by Chandra Kopparapu, pp. 18-19, 2002.

* cited by examiner

*Primary Examiner*—Phuoc Nguyen
(74) *Attorney, Agent, or Firm*—Mattingly & Malur, P.C.

(57) ABSTRACT

A load balancing method for continuation requests transmitted from client moves session information to continuation request to another business server and embeds a character string for making a request transmission apparatus identify the business server of destination in to a response to the continuation request to return the response to the client, so that the business server of destination to which subsequent requests transmitted from the client are transferred is switched.

18 Claims, 15 Drawing Sheets

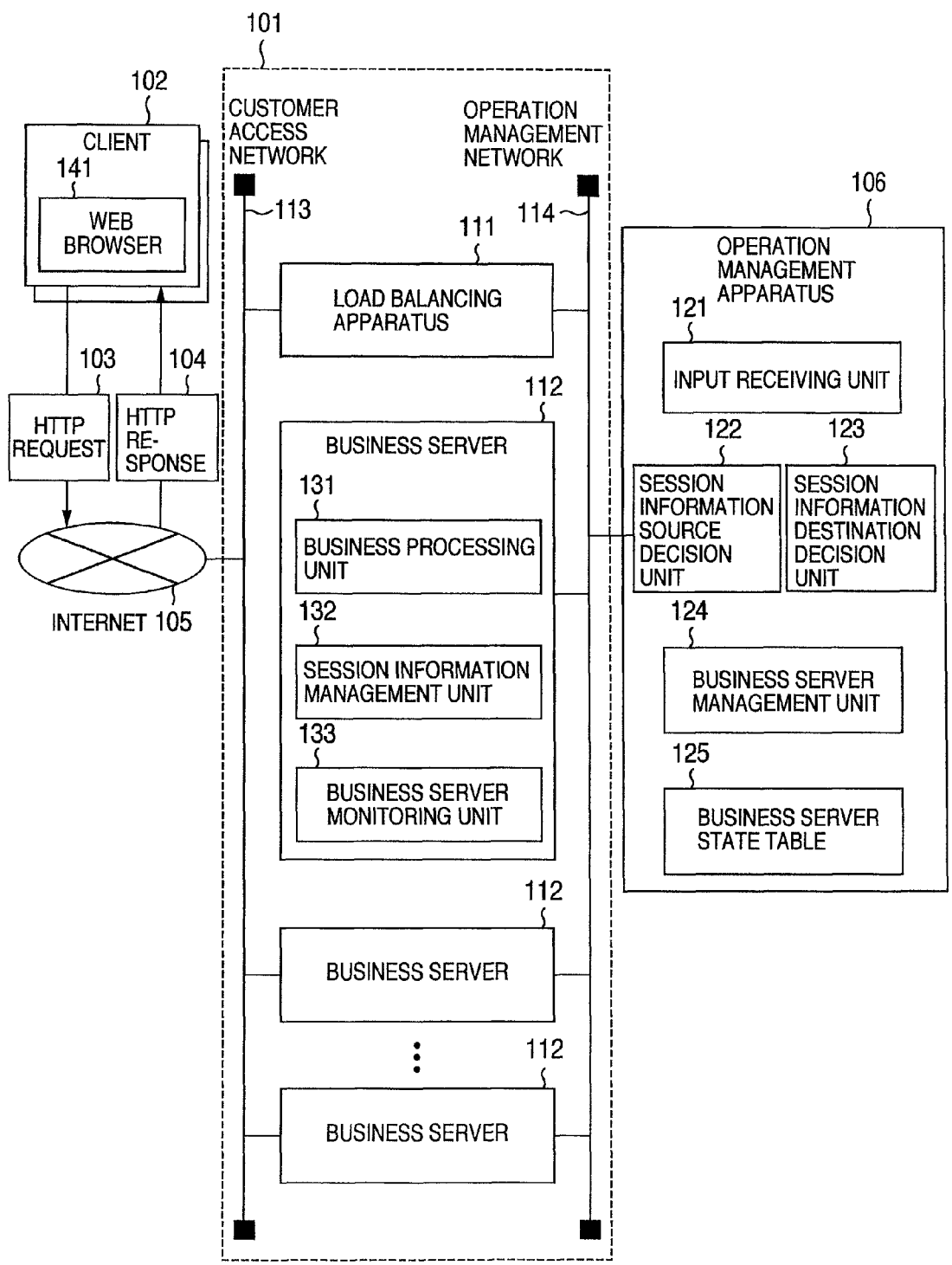

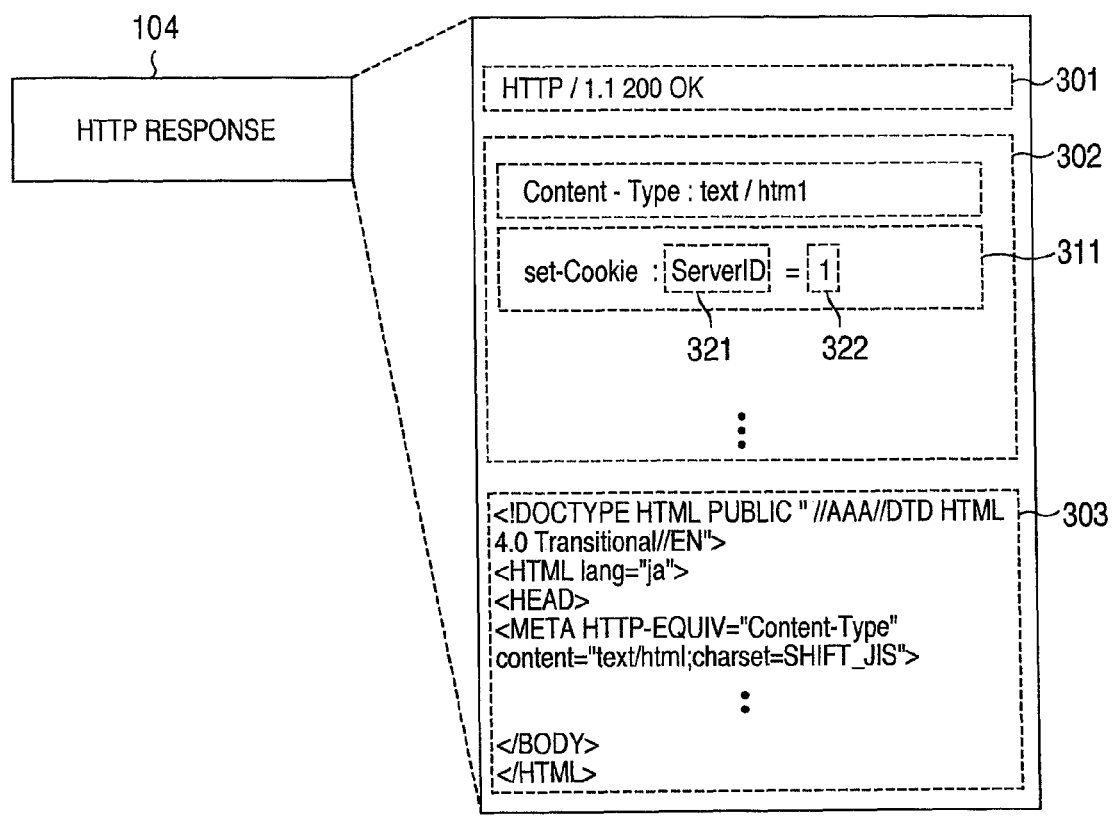

FIG.5

SESSION INFORMATION REARRANGEMENT DEFINITION — 500

| BUSINESS SERVER ADDRESS (511) | LOAD RATIO (512) |
|---|---|
| 192.168.1.10.80 | 1 |
| 192.168.1.11.80 | 1 |
| 192.168.1.12.80 | 1 |
| 192.168.1.13.80 | 1 |

| BUSINESS SERVER ADDRESS (611) | SERVER IDENTIFIER (612) | LOAD (SESSION INFORMATION NUMBER) (613) |
|---|---|---|
| 192.168.1.10.80 | 1 | 120 |
| 192.168.1.11.80 | 2 | 180 |
| 192.168.1.12.80 | 3 | 40 |
| 192.168.1.13.80 | 4 | 20 |

LOAD BALANCING METHOD AND SYSTEM

INCORPORATION BY REFERENCE

This application relates to and claims priority from Japanese Patent Application No. 2006-041810 filed on Feb. 20, 2006, the entire disclosure of which is incorporated herein by reference.

BACKGROUND

The present application relates to a load balancing method and system in a business system that provides business service treating session information.

In recent years, most of information systems that provide business service include a plurality of business servers and distribute or balance requests from a large number of clients by means of a load balancer in order to cope with the requests.

The algorithm used in the load balancing or the procedure for deciding business servers to which requests are transferred influences the performance of the whole business system. When the load balancing algorithm is not suitable, the requests from the clients are not distributed to the servers uniformly, so that the imbalance of loads occurs among the business servers. In the server bearing a heavy load, the processing time for requests is greatly increased and the request processing is delayed as compared with other business servers bearing a light load. For example, the delay of the request processing becomes obvious as delay of responses to clients who are service users.

Some effective methods of the load balancing algorithm are disclosed in John Wiley & Sons, "Load Balancing Servers, Firewalls and Caches", Wiley Computer, 2002, p. 19. For example, the method based on the "minimum connection number" in which the business server having the minimum number of connections to clients is selected or the method based on the "response time" in which the business server having a shortest response time to request is selected is often used. Further, M. Garland, S. Grassia, R. Monroe, S. Puri, "Complementing Distributed Server Group for the World Wide Web", Tech. Rep. CMU-CS-95-114, Carnegie Mellon University, School of Computer Science, January 1995 discloses the method in which the business server having a minimum occupation rate of CPU is selected to transfer requests thereto. These load balancing algorithms distributes or balance loads at the layer 4 level, that is, in the unit of TCP connection and accordingly are named the layer 4 switching.

For example, in the method disclosed in U.S. Pat. No. 6,098,093, since inquiries are made to a session information management server each time the request processing is made and the session information is loaded to the server, it takes time to make the request processing. In addition, the method has a problem that loads are concentrated on the session information management server. Further, there is a method in which the session information is arranged or stored in a shared database, although there arises a problem in the performance similarly (for example, Scott Hawkins, "BEA WebLogic Server Administration Kit", Prentice Hall Ptr, 2003, p. 78).

Generally, when a stateful application is operated, the load balancing method named the layer 7 persistence is often used. The layer 7 persistence is the load balancing method in which the first request from the client is transferred to any business server in accordance with the layer 4 switching and the second and subsequent requests (hereinafter described as continuation requests) from the same client are transferred to the same business server as the first time on the basis of the server identification character string contained in the requests. The server identification character string is to make a load balancer identify the business server to which the request is transferred and is assigned by the business server when the first request is transferred.

SUMMARY

According to an aspect of the present application, the load balancing method for continuation requests transmitted from the client in the business system including a plurality of business servers and a load balancer, comprising moving session information set in the continuation request to another business server after the business server executes business processing to the continuation request, embedding a character string for making the load balancer identify the business server of destination into a response to the continuation request to return the response to the client, and switching the business server of destination to which subsequent requests transmitted from the client are transferred.

According to another aspect of the present application, in the operation management system including monitoring means for monitoring loads on the plurality of business servers, storage means for storing the loads on the business servers monitored by the monitoring means, control processing means for deciding business servers of source and destination of session information and input receiving means for receiving load ratios from an operation manager, the control processing means decides the business servers of source and destination of the session information on the basis of the loads on the plurality of business servers stored in the storage means and the load ratios inputted by the operation manager to issue movement instructions to the decided business servers and switches the business server of destination to which continuation requests are transferred so that the loads among the business servers are shifted to satisfy the load ratios inputted by the operation manager.

BRIEF DESCRIPTION OF THE DRAWINGS

FIG. 1 is a block diagram schematically illustrating the whole configuration of an embodiment;

FIG. 3 is a diagram showing an example of structure of HTTP response;

FIG. 4 is a diagram showing an example of a continuation request distribution table;

FIG. 5 is a diagram showing an example of a load ratio definition picture;

FIG. 6 is a diagram showing an example of a business server state table;

DESCRIPTION OF THE EMBODIMENTS

Figure 2A:
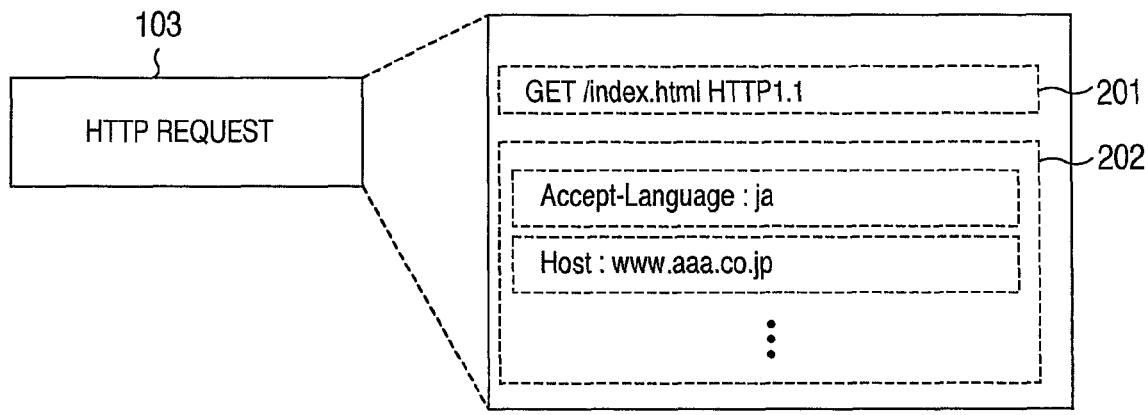
FIG. 2A is a diagram showing an example of structure of HTTP request.

In the method disclosed in U.S. Pat. No. 6,098,093, since inquiries are made to a session information management server each time the request processing is made and the session information is loaded to the server, it takes time to make the request processing. Further, loads are concentrated on the session information management server.

Generally, when a stateful application is operated, the load balancing method named the layer 7 persistence is often used. The layer 7 persistence is the load balancing method in which the first request from the client is transferred to any business server in accordance with the layer 4 switching and the second and subsequent requests (hereinafter described as continuation requests) from the same client are transferred to the same business server as the first time on the basis of the server identification character string contained in the requests. The server identification character string is to make the load balancer identify the business server of destination to which the request is transferred and is assigned by the business server when the first request is transferred.

As an example of the layer 7 persistence, there is a method in which the server identification character string is embedded in a Cookie header (for example, U.S. Pat. No. 6,473,802).

However, when the layer 7 persistence is used, the business server of destination to which the continuation request is transferred is always fixed and accordingly it is impossible to control the load balancing of continuation requests. Therefore, even when loads are inclined or imbalanced among the business servers at some time, the loads cannot be distributed uniformly like the layer 4 switching.

Particularly, when an apparatus is newly increased due to the reason that loads on the whole business system are increased or the like, the continuation requests to the existing apparatus cannot be switched to be transferred to the increased apparatus and accordingly loads on the existing apparatus cannot be reduced. Further, when a specific apparatus is desired to be shut off due to the reason such as maintenance, the continuation requests transferred to the specific apparatus cannot be switched to be transferred to another apparatus and accordingly it is necessary to wait until all of the session information existing in the apparatus is deleted (that is, until all clients are logged out) or shut down the apparatus forcedly. In the latter case, the client is suddenly cut off during utilization of service.

According to the embodiment, the continuation requests transferred to an apparatus can be switched to be transferred to another apparatus, so that loads on the apparatus can be reduced.

The load balance controlling method according to the embodiment of the present system is now described with reference to the drawings.

The layer 4 switching functions effectively when a stateless application that does not keep the conversation state with the client in the business server is operated. The reason thereof is that a series of requests generated by the clients are independent of each other in case of the stateless application and accordingly the load balancer may select an optimum business server for each of the requests at that time and transfer the request to the business server.

In contrast, when the stateful application that keeps the conversation state with the client in the business server is operated, an error sometimes occurs during request processing in the business server that has received the request from the load balancer when the layer 4 switching is used.

The stateful application is first described before the cause of error is described.

The stateful application is generally composed of a plurality of pages. The client reads out each page successively and inputs data at each page to transmit a request. The business server that has received the request stores the data inputted by the client in a memory in a corresponding manner to the client and uses the data upon execution of business processing.

In a shopping site, for example, the client inputs data such as name of purchased product at a purchase page and then inputs data such as address and credit card number at a user information input page after logging in. These data are stored in the memory of the business server and used upon settlement of accounts by the business server when the client depresses an account settlement button at an account settlement page finally.

A table or structure in which the data associated with the client are stored is named session information and exists in each client. A flow of business processing using the session information by the business server is described concretely by taking the above-mentioned shopping site as an example.

First, when the client depresses a logging-in button at a logging-in page to transmit a request, session information associated with the client is newly prepared in the business server and at the same time an identification number for identifying the client is issued. The business server transmits a response in which the issued identification number is stored to the client. The identification number is contained in subsequent requests from the client.

Next, when the client inputs product data at the product purchase page and transmits a request, the business server takes out the number and the product data contained in the request and reads out session information associated with the taken-out ID number from the memory. The product data is stored in the session information and a response is transmitted to the client.

Then, when the client inputs user data such as address and credit card number at the user information input page and transmits a request, the business server takes out the ID number and the user data from the request in the same manner as above and reads out the session information associated with the ID number from the memory. The user data is stored in the session information and a response is transmitted to the client.

Finally, when the client depresses the account settlement button at the account settlement page and transmits a request, the business server takes out all data from the session information corresponding to the ID number contained in the request and executes business processing.

When the stateful application is operated, a series of requests generated by each client is not independent and a request at some time sometimes utilizes the session information produced or updated before by the client. Accordingly, when the stateful application is operated, the series of requests generated by each client is all required to be transferred to the same business server.

When the layer 4 switching is used to balance loads at the time when the stateful application is operated, the load balancer selects an optimum business server for each of the series of requests generated from the client at that time and transfers the request to the business server and accordingly the request is sometimes transferred to a business server different from the former one. At this time, the business server tries to refer to the session information corresponding to the client, although since the session information is not stored in the memory, an error occurs.

FIG. 1 is a schematic diagram illustrating an example of the whole configuration of the system according to the embodiment.

A business system 101 forms an information processing system that provides business service to a client 102 and is connected to the client through the Internet 105 and a customer access network 113 so that the business system 101 can communicate with the client. Further, an operation management apparatus 106 is to manage the business system 101 and is connected through an operation management network 114 to the business system 101 so that the operation management apparatus 106 can communicate with the business system 101.

The client 102 is a computer that transmits a processing request to the business system 101 by means of the Web browser 141 in order to utilize the business service provided by the business system 101 and includes a processor, a storage unit and a communication unit. The client 102 transmits an HTTP (Hyper Text Transfer Protocol) request 103 to the business system 101 as the processing request. Further, the client 102 receives an HTTP response 104 from the business system 101 as the result of the processing request. The client 102 may be single or plural in number.

The business system 101 includes a load balancer 111 and a plurality of business servers 112. In FIG. 1, only one load balancer 111 is shown, although a plurality of load balancers 111 may be provided in the redundant configuration in preparation for case where failure occurs in the load balancer 111, for example.

The load balancer 111 has the function of distributing HTTP requests transmitted from the client 102 to the business servers 112 by means of the layer 7 persistence and includes a processor, a storage unit and a communication unit. The function of the load balancer 111 may be incorporated into the business servers 112 as software or hardware.

The business server 112 includes a processor (CPU), a memory, a storage unit and a communication unit.

A business processing unit 131 provides the business service to the client 102. The business processing unit 131 performs the business processing to the HTTP request transferred from the load balancer 111, so that the business processing unit 131 generates the HTTP response 104 in which processing result is stored and returns the HTTP response 104 to the client 102.

The business service provided by the business processing unit 131 includes purchase service and seat reservation service as concrete examples, although contents of the business service are not prescribed particularly in the embodiment. However, it is supposed that the stateful service in which the conversation state with the client 102 is kept or stored in the memory of the business server 112 as session information is operated.

A session information management unit 132 moves or receives the session information. The movement of the session information is the processing for taking or reading out specific session information from the memory of the business server 112 including the session information management unit itself and transmitting the session information to the session information management unit 132 of another business server 112. Further, the reception of the session information is the processing for receiving the session information transmitted from the session information management unit 132 of another business server 112 and storing the session information in the memory of the business server 112 including the session information management unit itself. The two processings may be constituted as separate processes or as separate threads of the same process.

Concrete processing of the movement and reception of the session information is described later.

A business server monitoring unit 133 collects various load information in the business server 112 including the business server monitoring unit itself repeatedly, for example periodically, and transmits the load information to a business server management unit 124 of the operation management apparatus 106.

The load information contains various information concerning operation of the business server 112 such as, for example, CPU occupation rate, memory occupation rate, memory occupation amount, connection number to client 102, response time from reception of HTTP request 103 issued by client 102 to transmission of HTTP response 104, number of HTTP requests 103 received from client 102 within a predetermined time and number of pieces of session information arranged in each business server 112 and these may be combined to be collected.

The business processing unit 131, the session information management unit 132 and the business server monitoring unit 133 shown in FIG. 1 may be configured by respective independent hardware such as microchip or may be configured by software containing a business processing program, a session information management program and a business server monitoring program and stored in the memory, not shown, in the business server of FIG. 1 to be executed by the processor (CPU) not shown so that the functions of the respective units may be realized.

The operation management apparatus 106 includes a processor (CPU), a memory, a storage unit and a communication unit.

When the session information is desired to be rearranged among the plurality of business servers 112 included in the business system 101, an operation manager instructs rearrangement by means of an input receiving unit 121 of the operation management apparatus 106.

The case where the rearrangement is desired to be made contains, for example, the case where the number of pieces of session information is inclined or imbalanced among the business servers 112 so that loads cannot be distributed uniformly due to the reason that the business server 112 is newly increased or the like, the case where a specific business server 112 is desired to be shut off in a short time without deleting session information in the business server and the like.

When the number of pieces of session information is inclined or imbalanced among the business servers 112, the business server 112 of destination to which the continuation HTTP request 103 is transferred is switched in order to distribute loads uniformly. At this time, the session information set in the continuation HTTP request 103 is moved to the business server 112 of destination. The movement processing is performed by the number of times corresponding to the number of the continuation HTTP requests 103 to be switched in order to distribute loads among the business servers 112 uniformly.

When a specific business server 112 is desired to be shut off, all of continuation HTTP requests 103 transferred to the business server 112 are switched to be transferred to another business server 112. At this time, the session information set in the continuous HTTP requests 103 is moved to the business server 112 of destination. The movement processing is performed by the number of times corresponding to the number of the continuation HTTP requests 103 to be transferred to the business server 112 to be shut off.

The rearrangement of session information is performed by liaison of a session information source decision unit 122, a session information destination decision unit 123 and the session information management unit 132 of the business server 112 and its detailed processing is described later.

The session information source decision unit 122 selects one or plural business servers of sources from which the session information is moved or transmitted from among the whole business servers 112 included in the business system 101 and transmits movement instructions to the selected business servers 112.

The session information destination decision unit 123 decides a business server 112 of destination to which the session information is moved or transferred. The session information management unit 132 in the business server 112 performing the movement processing of session information makes inquiries about the destination device to the session information destination decision unit 123 in order to specify the destination device of the session information. The session information destination decision unit 123 decides the destination device in response to the inquiries and notifies the decided business server 112 to the session information management unit 132 that has made the inquiries.

The business server management unit 124 unitarily manages the load information of the business servers 112. The business server management unit 124 receives the load information from the business server monitoring units 133 in the business servers 112 repeatedly, for example periodically, and records the received or collected load information to a business server state table 125.

The business server state table 125 is to record the load information on the whole business servers 112 included in the business system 101. The table 125 is updated by the business server management unit 124 repeatedly, for example periodically. The table 125 is referred to by the session information source decision unit 122 and the session information destination decision unit 123. The session information source decision unit 122 decides the business server 112 of source from which the session information is moved or transferred on the basis of the load information on the business servers 112 recorded in the table 125. Similarly, the session information destination decision unit 123 decides the business server 112 of destination on the basis of the load information.

Further, the business server state table is stored in a storage unit not shown in FIG. 1.

The input receiving unit 121, the session information source decision unit 122, the session information destination decision unit 123 and the business server management unit 124 shown in FIG. 1 may be configured by respective independent hardware or may be configured by software containing an input receiving program, a session information source decision program, a session information destination decision program and a business server management program and stored in the memory, not shown, of the operation management apparatus of FIG. 1 to be executed by the processor (CPU) not shown so that the functions of the respective units may be realized.

Referring now to FIGS. 2 to 6, detailed processing operation performed by the client 102, the load balancer 111, the business server 112 and the operation management apparatus 106 is described.

The client 102 transmits the HTTP request 103 including the processing request to the business system 101 and receives the HTTP response 104 including the processing result from the business system 101 in order to utilize the business service.

The HTTP request 103 is divided broadly into two kinds of requests. One request is a "first HTTP request" transmitted when the client 102 utilizes the business service first and the other is a "continuation HTTP request" transmitted when the service is utilized continuously after transmission of the first HTTP request.

Figure 2B:
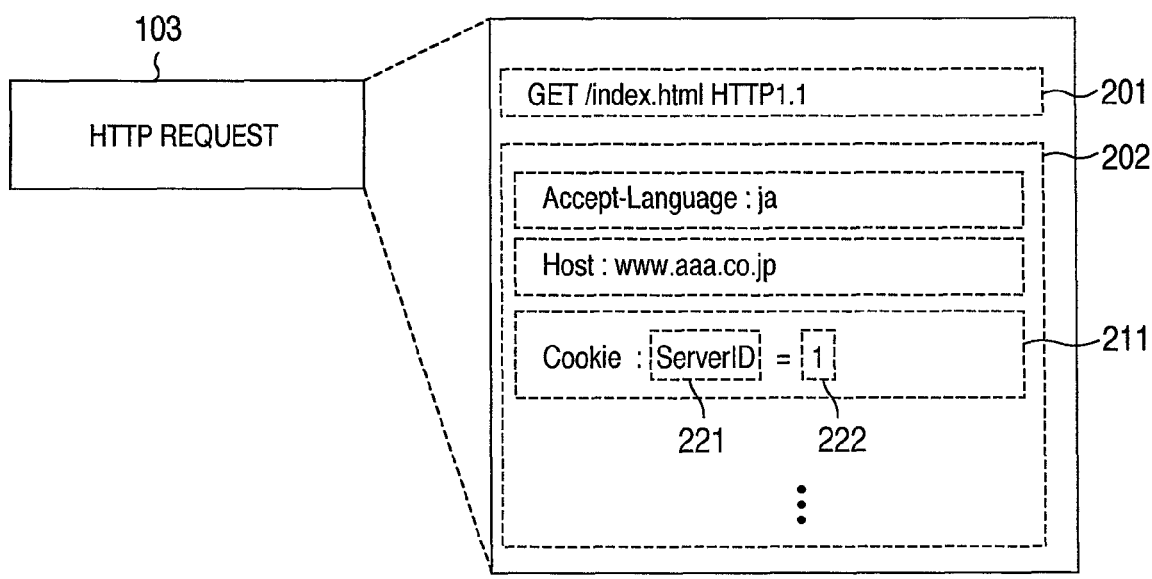
FIG. 2B is a diagram showing an example of structure of HTTP request.

FIGS. 2A and 2B represent the request structure of HTTP 1.1 defined in the RFC (Request for Comments) 2616 and the HTTP requests 103 shown in FIGS. 2A and 2B are preferred examples in the embodiment.

FIG. 2A represents the structure of the first HTTP request including a request line (201) representing the processing request and a header field (202) containing various information concerning the request.

On the other hand, FIG. 2B represents the structure of the continuation HTTP request 103 including a Cookie field (211) added thereto differently from the first HTTP request 103. The Cookie field (211) stores or contains a character string used to make the load balancer 111 continuously transfer the continuation request to the same business server 112 by means of the layer 7 persistence. Although described later in detail, a Cookie name (221) is a character string for making the load balancer 111 judge or understand that the HTTP request containing the Cookie name itself is the continuation HTTP request and a Cookie value (222) is a character string for making the load balancer 111 identify the business server 112 of destination to which the HTTP request 103 containing the Cookie value itself is transferred. Generally, the character strings are stored in the format of "Cookie name (221) =Cookie value (222)".

In the embodiment, as measures for making the load balancer 111 identify the business server 112 of destination to which the continuation HTTP request is transferred, the Cookie switching that is one mounted form of the layer 7 persistence and utilizes the Cookie field (211) is described by way of example, although in the embodiment the measures may be any others as far as the business server 112 can be identified from the continuation HTTP request 103. For example, the method of embedding information for identifying the business server 112 in an address URL of the continuation HTTP request and making identification by utilizing the URL switching provided in a general load balancer or the method of adding a header field for identifying the business server 112 to the HTTP request 103 originally and making identification by utilizing the Header switching provided in the general load balancer may be applicable to the embodiment.

FIG. 3 represents the response structure of HTTP 1.1 defined in RFC 2616 and the HTTP response 104 shown in FIG. 3 is a preferred example in the embodiment. The HTTP response 104 is produced by the business processing unit 131 and includes a status line (301) representing the status of processing result, a header field (302) containing various information concerning the response and a message body (303) in which the processing result is stored.

A set-Cookie field (311) contained in the header field (302) is the attribute for indicating that a character string described in the field 311 is contained in the Cookie field (211) of the HTTP request 103 issued from next time. For example, when the character string of "ServerID=1" is described in the set-Cookie field (311), the Cookie field (211) containing the character string of "ServerID=1" is contained in the HTTP request 103 transmitted subsequently from the client 102 that has received the HTTP response 104.

The processing performed by the load balancer 111 is now described. The HTTP request 103 transmitted to the business system 101 from the client 102 is first received by the load balancer 111. The load balancer 111 selects one from among the plurality of business servers 112 provided in the business system 101 and transfers the received HTTP request 103 to the selected business server 112. The selection processing of the business server 112 performed by the load balancer 111 is performed on the basis of the Cookie switching.

The selection processing procedure performed on the basis of the Cookie switching is now described in detail. First, the load balancer 111 collates the Cookie field (211) of the request with a continuation request distribution table contained in the load balancer itself in order to judge whether the received HTTP request 103 is new HTTP request or continuation HTTP request. The switching processing is executed by the processor included in the load balancer.

FIG. 4 shows an example of the continuation request distribution table. The continuation request distribution table is stored in a memory or storage unit such as hard disk drive of the load balancer.

The character string for judging whether the received HTTP request 103 is the continuation request or not is stored in a request identifier field (411). When the Cookie name (221) in the Cookie field (211) contained in the request is identical with the character string stored in the request identifier field, the request is judged to be the continuation HTTP request. In the example shown in FIG. 4, when the Cookie name (221) contained in the received HTTP request 103 is "ServerID", the HTTP request is judged to be the continuation request.

The roles of a server identifier field (412) and a business server address field (413) are described later.

When the received HTTP request 103 is a new request, the load balancer 111 selects a business server 112 of destination to which the request is transferred on the basis of the layer 4 switching algorithm. The layer 4 switching algorithm includes the method based on the "minimum connection number" in which the business server having a minimum connection number to clients is selected, the method based on the "response time" in which the business server having a shortest response time to request is selected and the method based on the "CPU load" in which the business server having a minimum occupation rate of CPU is selected, although any layer 4 switching algorithm mounted in general load balancers and also including the above algorithm may be used in the embodiment.

When the received HTTP request 103 is a continuation request, the load balancer 111 selects a business server 112 of destination on the basis of the Cookie value (222) in the Cookie field (211) contained in the HTTP request 103 and the server identifier field (412) in the continuation request distribution table 400.

The server identifier field (412) stores the value for identifying the business server 112 of destination to which the continuation HTTP request 103 is transferred and the business server address field (413) stores IP address and port number as the address of the business server 112.

The load balancer 111 collates the Cookie value (222) in the Cookie field (211) contained in the continuation request with the server identifier field (412) and when there is a row having the server identifier identical with the Cookie value (222), the load balancer 111 transfers the request to the business server 112 having the business server address 413 stored in the row as the address.

For example, when the Cookie value (222) of the received continuation HTTP request 103 is "1" in case where the value shown in FIG. 4 is stored in the continuation request distribution table 400, the load balancer 111 transfers the HTTP request 103 to the business server 112 having "192.168.1.10:80" as the address. The foregoing is the processing of selecting the server of destination by means of the Cookie switching.

Although described later in detail, the Cookie name (221) and the Cookie value (222) in the Cookie field (211) contained in the continuation HTTP request are given by the business server to which the first HTTP request has been transferred.

Concretely, when the business server 112 produces the HTTP response 104 to the first HTTP request, the business server 112 stores the same value as that in the request identifier field (411) of the continuation request distribution table 400 into the Cookie name (321) in the set-Cookie field (311) and the value in the server identifier field (412) corresponding to the business server address field (413) having the same address as that of the business server itself into the Cookie value (322).

As described above, the business server 112 gives the Cookie name (321) and the Cookie value (322) corresponding to the contents in the continuation request distribution table 400 stored in the load balancer 111 to the HTTP response 104 to the first HTTP request, so that the load balancer 111 can transfer the subsequent continuation HTTP requests to the same business server 112 as that to which the first continuation HTTP request has been transferred continuously.

The processing performed by the business server 112 is described. The business processing unit 131 performs the business processing to the HTTP request 103 received from the load balancer 111 and produces the HTTP response 104.

In the embodiment, it is supposed that the stateful application for holding the conversation state with the client 102 is operated in the business processing unit 131 and when the business processing unit 131 performs the business processing to the first HTTP request 103, the business processing unit 131 produces the session information corresponding to the client 102 of source that transmits the HTTP request 103 in the memory of the business processing unit itself. The session information is used to perform the business processing with the business server.

As a preferred example of the business processing unit 131, there is Apache Tomcat that is mounted in J2EE (Java 2 Platform, Enterprise Edition: trademark) Servlet API. In the embodiment, the business processing unit 131 is described on the basis of Apache Tomcat, although the embodiment is not limited to Apache Tomcat.

After execution of the business processing, the business processing unit 131 produces the HTTP response 104 and stores values corresponding to the processing results into the status line (301), the header field (302) and the message body (303) of the HTTP response 104.

At this time, the business processing unit 131 stores the Cookie name (321) and the Cookie value (322) into the set-Cookie field (311) of the header field (302) in order to realize that the load balancer 111 continuously transfers the subsequent continuation requests 103 transmitted from the client 102 to the business server 112 including the business processing unit itself. As described above, the same value as that in the request identifier field (411) of the continuation request distribution table 400 included in the load balancer 111 is stored in the Cookie name (321) and the same value as that in the server identifier field (412) corresponding to the business server address field (413) having the same address as that of the business server itself is stored in the Cookie value (322).

The storing method into the set-Cookie field (311) of the HTTP response 104 includes a storing method made at the application side of the business processing unit 131 and a storing method made at the business processing board side.

The former method is the method of adding a logic for storing a value in the set-Cookie field (311) to a business processing logic of the application. As a preferred example thereof, there is a method of designating proper Cookie name (321) and Cookie value (322) as arguments of HttpServletResponse.addCooke method in Web application based on Servlet API and reading out them.

The latter method is the method of making the business processing board side store value in the set-Cookie field (311) of the HTTP response 103. As a preferred example thereof, there is a method using mod_headers module of Apache HTTP Server. In this case, the business processing unit 131 is constituted by Apache HTTP server and Apache Tomcat incorporating the mod_headers module and the character string to be stored in the set-Cookie field (311) is set in http.conf that is a setting file of Apache HTTP server, so that the HTTP response 104 produced by Apache Tomcat is received by the Apache HTTP server and the set character string is stored in the set-Cookie field (311) of the response 104.

In the embodiment, any of the above methods is applicable. However, as the values of the Cookie name (321) and the Cookie value (322) given by the business processing units 131, the operation manager is required to designate proper values previously in accordance with the contents of the continuation request distribution table 400 as described above.

The session information management unit 132 performs session information movement processing for transmitting the session information arranged in the memory of the business server 112 in which the session information management unit itself is operated to the session information management unit 132 of another business server 112. Further, the session information management unit 132 performs session information receiving processing for receiving the session information transmitted from the session information management unit 132 operating in the other business server 112 and storing the received session information in the memory of the business server 112 in which the session information management unit itself is operated.

The transmission processing of the session information is now described concretely. As described above, the session information is the table or structure in which data used in processing for each client is stored. The session information is stored in the memory as byte arrangement. The session information management unit 132 converts the byte arrangement representing the session information into a data format transmittable through the operation management network 114 and transmits it to the session information management unit 132 in the business server 112 having the session information to be moved. The session information management unit 132 that has received the session information reconverts the received data into the byte arrangement readable by the business processing unit 131 and stores it in the memory.

The transmittable data format is not prescribed in the embodiment particularly and may be any data format as far as the session information management unit 132 on the reception side can analyze the data transmitted by the session information management unit 132 on the transmission side and reconstruct it as the session information. For example, there is considered the method in which data stored in the session information is embedded in the body part of the HTTP packet as a character string and the session information management unit 132 on the reception side analyzes the character string to construct the session information.

Further, in addition to the method of transmitting the session information from the source business server to the destination business server, the method of transmitting the session information to the operation management apparatus once and transmitting it to the business server of destination through the operation management apparatus or the method of temporarily storing the session information in a shared storage device for a shared server or the like and making the business server of destination receive it to thereby move the session information can be adopted.

The movement of the session information is made by the session information management unit 132 when the business processing unit 131 ends the business processing to the continuation HTTP request 103 set in the session information. The movement processing made by the session information management unit 132 is now described concretely.

First, the business processing unit 131 delivers the continuation HTTP request 103 and the produced HTTP response 104 to the session information management unit 132 after execution of the business processing to the continuation HTTP request 103. The reason that the continuation HTTP request 103 is delivered to the session information management unit 132 is that the session information used by the business processing unit 131 in the business processing to the continuation HTTP request 103 is specified as an object to be moved.

Generally, the business processing unit 131 uses the character string for identifying the session information stored in the request in order to specify the session information used when the business processing to the HTTP request is performed. The business processing unit 131 manages the session information in a corresponding manner to the character string for identification and specifies the session information used on the basis of the character string for identification taken out from the request. The session information management unit 132 also takes out the character string for identification from the continuation HTTP request 103 by means of the same method as that of the business processing unit 131 and specifies the taken-out session information as the object to be moved. The character string for identification is named a session information identifier.

The session information identifier is usually contained in the Cookie field (211) or the character string of URL of the continuation HTTP request 103 in the same manner as the server identifier, although in the embodiment any method may be applicable as far as the business processing unit 131 and the session information management unit 132 can identify the session information from the continuation HTTP request 103.

Returning now to description of the movement processing of session information, when the session information management unit 132 takes out the session information to be moved, the session information management unit 132 transmits the session information to the session information management unit 132 in another business server 112. At this time, it is necessary to specify the business server 112 of destination to which the session information is moved. To this end, the session information management unit 132 makes inquiries about the business server 112 of destination to the session information destination decision unit 123 to acquire the address and the server identifier of the business server 112 of destination and specifies the business server 112 as the destination device.

Further, the session information destination decision unit of the operation management apparatus may notify the business server of destination to the business server of source together with rearrangement instructions instead of making the session information management unit of the business server of source make inquiries about the business server of destination to the session information destination decision unit.

The session information destination decision unit 123 selects the business server 112 of destination in response to the inquiries about the destination device from the session information management unit 132. The selection is made on the basis of loads on the business servers 112 and input values of the operation manager. Although described later in detail, the input values of the operation manager include instructions for uniforming loads among the business servers and instructions for shutting off a specific business server 112 and are inputted by means of the input receiving unit 121.

In the embodiment, the "load ratio" representing the ratio of loads on the business servers 112 is used as the input value. The load ratio is assigned to each of the business servers 112 to thereby make rearrangement of the session information so that the session information is shifted to satisfy the loads proportional to the ratios among the business servers 112. The destination selection processing of the session information destination decision unit 123 is described later in detail.

When notification of success in movement is received from the session information management unit 132 in the business server 112 of destination after transmission of the session information, the session information management unit 132 deletes the transmitted session information from the memory and overwrites the set-Cookie field (311) of the HTTP response 104 received before from the business processing unit 131.

In the embodiment, the same value (that is, the same value as the former value) as the Cookie name (321) assigned by the business processing unit 131 is stored as the Cookie name (321) and the server identifier received before from the session information destination decision unit 123 is stored as the Cookie value (322). In this manner, the Cookie value (322) is rewritten by the server identifier of the business server 112 of destination, so that the subsequent continuation HTTP requests 103 are transferred to the business server 112 of destination to which the session information is moved by means of the load balancer 111.

After transmission of the session information, when notification of failure in movement is received from the session information management unit 132 in the business server 112 of destination, the HTTP response 104 received before from the business processing unit 131 is returned to the client 102 without rewriting the HTTP response 104. In other words, the movement of the session information in this case is not made and subsequent continuation HTTP requests 103 are not rewritten either.

The foregoing is the session information movement procedure performed by the session management unit 132.

The movement processing of session information is started in response to the operation manager's rearrangement instructions when loads are inclined or imbalanced among the business servers 112 or when a specific apparatus is shut off or the like. Concretely, when the session information source decision unit 122 that has received the rearrangement instructions transmits the movement instructions to the session information management unit 132, the session information management unit 132 that has received the movement instructions performs the movement processing after end of the business processing to all of the subsequent continuation HTTP requests 103.

Further, as a result of the rearrangement, when the loads among the business servers 112 are uniformed, it is necessary to end the movement processing. In this case, the session information source decision unit 122 detects the session information management unit 132 that is to end the movement processing and transmits movement ending instructions to the session information management unit 132. The session information management unit 132 that has received the movement ending instructions ends the movement processing and does not perform the movement processing of the session information after the business processing of the subsequent continuation HTTP requests 103.

Further, the session information management unit 132 performs the processing for receiving the session information moved from the session information management unit 132 of another business server 112. After received the session information, the session information management unit 132 stores the received session information in the memory of the business server 112 including the session information management unit itself and when it is successful to store the session information, the session information management unit 132 notifies success in movement to the session information management unit 132 of source that has transmitted the session information.

However, when the session information having the same session information identifier is already stored in the memory or when the storing of the session information is unsuccessful due to lack of memory or the like, the session information management unit 132 notifies unsuccess in movement to the session information management unit 132 of source that has transmitted the session information.

The business server monitoring unit 133 collects load information in the business servers 112 in which the business server monitoring unit itself is operated repeatedly, for example periodically, and transmits the collected load information to the business server management unit 124 of the operation management apparatus 106. The load information of the business servers 112 received by the business server management unit 124 is written in the business server state table 125 of the operation management apparatus 106 to be referred to by the session information source decision unit 122 and the session information destination decision unit 123.

The session information source decision unit 122 decides the business server 112 of source in accordance with the load information of the business servers 112 recorded in the business server state table 125 and the operation manager's input values. Similarly, the session information destination decision unit 123 decides the business server 112 of destination in accordance with the load information of the business servers 112 and the operation manager's input values.

The load information to be collected contains various information concerning current operation of the business servers 112 such as, for example, CPU occupation rate, memory occupation rate, memory occupation amount, connection number to client 102, response time from reception of HTTP request 103 issued by client 102 to transmission of HTTP response 104 and number of HTTP requests 103 received from client 102 within a predetermined time.

Further, when the layer 7 persistence of the load balancer is utilized to balance loads, the number of pieces of session information arranged in each business server 112 may be also used as an index of loads. The reason thereof is that when the number of pieces of session information arranged in each business server 112 is numerous, the continuation HTTP requests to be transmitted are necessarily increased, so that the business processing is made frequently.

In the embodiment, various information as exemplified above may be used as attributes collected by the business server monitoring unit 133, although description is made by taking as the load information the number of pieces of session information as an example in the embodiment.

The business server monitoring unit 133 collects loads periodically and transmits the load information to the business server management unit 124, although it is not necessary that the collection interval and the transmission interval are necessarily identical with each other. For example, the method may be also used in which the business server monitoring unit 133 continuously collects the load information at predetermined intervals to transmit the load information to the business server management unit 124 when the business server monitoring unit 133 detects variation in loads but does not transmit the load information except it. In the embodiment, the collection interval, the transmission interval and the transmission method may be set arbitrarily.

The processing performed by the operation management apparatus 106 is described.

FIG. 5 shows an example of an input picture provided by the input receiving unit 121. When the session information is desired to be rearranged among the business servers 112, the operation manager issues arrangement instructions by means of the input receiving unit 121. A list of business servers 112 that are currently operated in the business system 101 is shown in a business server address field (511). The ratios of loads rearranged among the business servers 112 are shown in a load ratio field (512) and the operation manager inputs any values in the load ratio field.

As described above, in the embodiment, the number of pieces of session information rearranged is used as the load on the business servers 112. For example, when inputting has been made as shown in the example of FIG. 5, movement of the session information is made repeatedly among four business servers 112 so that the number of pieces of session information is rearranged uniformly in the ratio among the four business servers 112.

On the other hand, in FIG. 5, when it is desired to shut off the business server 112 having the address of 192.168.1.10:80, inputting is made as 0:1:1:1, so that all the session information in the business server 112 is moved to other three business servers 112 to uniform the ratios of session information among the three business servers. Further, when it is desired to increase the load on a specific business server as compared with other business servers due to the reason that performance of the business server 112 having the address of 192.168.1.10:80 is excellent as compared with other three business servers, for example, the business server has a large memory capacity, inputting is made as 2:1:1:1, so that different load ratios can be realized.

In the description of the embodiment, it is supposed that the session information is rearranged in response to the operation manager's clear instructions, although it is applicable in the embodiment that rearrangement of the session information is started autonomously. In the autonomous starting, instead of starting the rearrangement in response to the operation manager's clear instructions, a module of the operation management apparatus 106 detects that the load on the business server 112 deviates from a reference load ratio and instructs to start the rearrangement of session information automatically instead of the operation manager.

The module of the operation management apparatus 106 is the business server management unit 124, for example. In this case, when the operation manager first inputs the reference load ratio by means of the input receiving unit 121, the business server management unit 124 monitors the business server state table 125 repeatedly, for example periodically, hereafter. When the business server management unit 124 detects that the load ratio of the business server 112 deviates from the load ratio inputted before by the operation manager, the business server management unit 124 transmits rearrangement instructions to the session information source decision unit 122 to thereby start the rearrangement processing of session information.

When the operation manager inputs the load ratio and depresses an OK button 513, the input receiving unit 121 transmits the rearrangement instructions to the session information source decision unit 122.

The session information source decision unit 122 refers to values in the load ratio field (512) inputted by the operation manager and the business server state table 125 in which current loads on the business servers 112 are recorded to decide one or plural business servers 112 of source and transmits the movement instructions to the decided business servers 112. The business server state table 125 is first described.

FIG. 6 shows an example of the structure of the business server state table 125. The business server state table 125 is to store the load information of the business servers 112 at this moment. Addresses of business servers 112 being operated currently are stored in a business server address field (611). Server identification character strings of the business servers 112 are stored in a server identifier field (612). Load information of the business servers being operated currently is stored in a load field (613). The load information is the number of pieces of session information arranged in each business server in the embodiment. The contents of the load field (613) are updated by the business server management unit 124 repeatedly, for example when the load information is received from the business server monitoring units 133.

The decision procedure of the source business server 112 performed by the session information source decision unit 122 is now described.

In order to decide the business server 112 of source from which the session information is moved, the session information source decision unit 122 calculates the total of loads on the business servers 112 at this moment with reference to the business server state table 125 and then calculates redistributed values of the total of loads on the basis of values in the load ratio field (512) for each of the business servers 112. The redistributed values are hereinafter named "target load values". For example, when the input values by the operation manager are as shown in FIG. 5 and the numbers of pieces of session information for the business servers 112 are as shown in FIG. 6, the target load values of the business servers 112 are calculated as $(120+180+40+20)/(1+1+1+1) \times 1 = 90$ for the four business servers 112.

The session information source decision unit 122 decides the business server 112 having a current load value exceeding the calculated target load value as the business server of source from which the session information is moved. In the above example, the business servers 112 having addresses of 192.168.1.10:80 (session information number=120, target load value=90) and 192.168.1.11:80 (session information number=180, target load value=90) are decided as the business servers 112 of source.

The session information source decision unit 122 transmits the movement instructions to the session information management unit 132 of the business server 112 decided as the source and the session information management unit 132 that has received the movement instructions starts movement of the session information in the business server 112 including the session information management unit itself.

After transmission of the movement instructions to the session information management unit 132, it is necessary to end rearrangement of the session information when the load values among the business servers 112 are equal to values decided on the basis of the respective load ratios 513. Accordingly, the session information source decision unit 122 performs judgment processing repeatedly for ending the movement processing to the session information management unit 132 to which the movement instructions have been issued, for example periodically.

The judgment processing performed by the session information source decision unit 122 is now described. The session information source decision unit 122 compares a current load value of the business server 112 to which the movement instructions have been issued with a target load value calculated at that time and when the current load value is equal to or lighter than the target load value, the session information source decision unit 122 transmits movement ending instructions to the session information management unit 132 in the business server 112.

The session information source decision unit 122 performs the judgment processing to all of the session information management units 132 that are performing the movement processing currently repeatedly and ends the rearrangement when all of the session information management units 132 end the movement processing and issues an event representing the end of rearrangement to the input receiving unit 121.

In the end judgment processing, it is not necessary to perform the movement processing until the current load value is necessarily equal to the target load value. For example, when a difference between the current load value and the target load value of the business server 112 is smaller than a certain value, it may be judged that the movement processing is ended. This is convenient when the movement processing is desired to be ended as soon as possible since the movement processing itself burdens the business server with a load. This certain value is hereinafter named "permissible error value".

In the embodiment, this value may be set to any value. For example, when the permissible error value is set to "target load value×0.1", the number of pieces of session information arranged currently in the business server 112-A is 120 and the target load value is 110, the permissible error value is calculated to 110×0.1=11, so that the difference between the number of pieces of session information and the target load value is smaller than the permissible error value and accordingly the movement processing is ended. Therefore, the session information source decision unit 122 transmits the movement ending instructions to the session information management unit 132 in the business server 112.

The session information destination decision unit 123 decides the business server 112 of destination to which the session information is moved in response to the inquiries about the destination device made by the session information management unit 132 of the business server 112 and returns the address and the server identifier of the business server 112 to the session information management unit 132.

The destination decision method performed by the session information destination decision unit 123 is now described.

As described above, when the session information management unit 132 in the business server 112 moves the session information, the session information management unit 132 makes inquiries about the destination device to the session information destination decision unit 123 in order to specify the business server 112 of destination. The session information destination decision unit 123 that has received the inquires calculates the target load value on the basis of the load information of the business servers 112 recorded in the business server state table 125 and the load ratio value in the load ratio field (512) inputted by the operation managers and selects one or plural business servers 112 having the current load value lighter than the calculated target load value as destination candidates.

For example, when the input values by the operation manager are as shown in FIG. 5 and the loads (session information number) of the business servers 112 are as shown in FIG. 6, the business servers 112 having the addresses of 192.168.1.12:80 (target load value=90, session information number=40) and 192.168.1.13:80 (target load value=90, session information number=20) are selected as the destination candidates.

The session information destination decision unit 123 selects any one from among the destination candidates and decides it as the destination device. In the embodiment, the business server having the minimum load, that is, the minimum number of pieces of session information arranged in the destination candidates is decided as the destination device. If there are a plurality of business servers having the minimum load, any one of them is selected.

In the embodiment, the method of deciding the destination device from among the destination candidates is not limited particularly. Besides the above method, for example, the method of deciding the destination device in accordance with reciprocal ratios of the load values among the destination candidates is applicable to the embodiment.

The session information source decision unit 122 and the session information destination decision unit 123 perform decision of the source device of session information, ending of the session information movement processing to the source device and decision of the destination device properly on the basis of the business server state table 125 in which current load information is stored so that loads among the business servers are shifted to satisfy the load ratios inputted by the operation manger.

In the embodiment, the rearrangement is made in response to the manager's rearrangement instructions, although a threshold of load is previously determined to compare the acquired load value with the threshold and when the threshold is exceeded, the rearrangement instructions may be transmitted without dependence on the manager's instruction. The information for the load threshold is stored in the storage unit.

As the threshold information, the absolute threshold to the memory occupation amount of the business server, the difference in loads between plural business servers and the load radio between plural business servers may be set.

In the example shown in FIG. 6, when the number of sessions for the business server having the server identifier of 2 is increased by 1 in case where the threshold is defined as the difference in the number of pieces of session information between the business servers exceeding 160, for example, the difference in the session number between the business servers having the server identifiers of 2 and 4 exceeds 160, so that rearrangement of session is started.

Further, when the number of sessions of the business server having the server identifier of 2 is increased by 20 in case where the threshold is defined as the ratio in the number of pieces of session information between business servers exceeding 1:10, the session number of the business server having the server identifier of 2 reaches 200 and the ratio between the session number of 200 and the session number of 20 for the business server having the server identifier of 4 exceeds 1:10, so that rearrangement of the session information is started.

The threshold is not limited to the session number and various information concerning current operation of the business servers 112 such as CPU occupation rate, memory occupation rate, memory occupation amount, connection number to client 102, response time from reception of HTTP request 103 issued by client 102 to transmission of HTTP response 104 and number of HTTP requests 103 received from client 102 within a predetermined time may be used as the threshold.

The load value information may be collected from the business servers or from the load balancer. For the session number, it is easy to collect it from the load balancer.

Referring now to the flow charts shown in FIGS. 7 to 11, each processing operation in the embodiment is described concretely.

Figure 7:
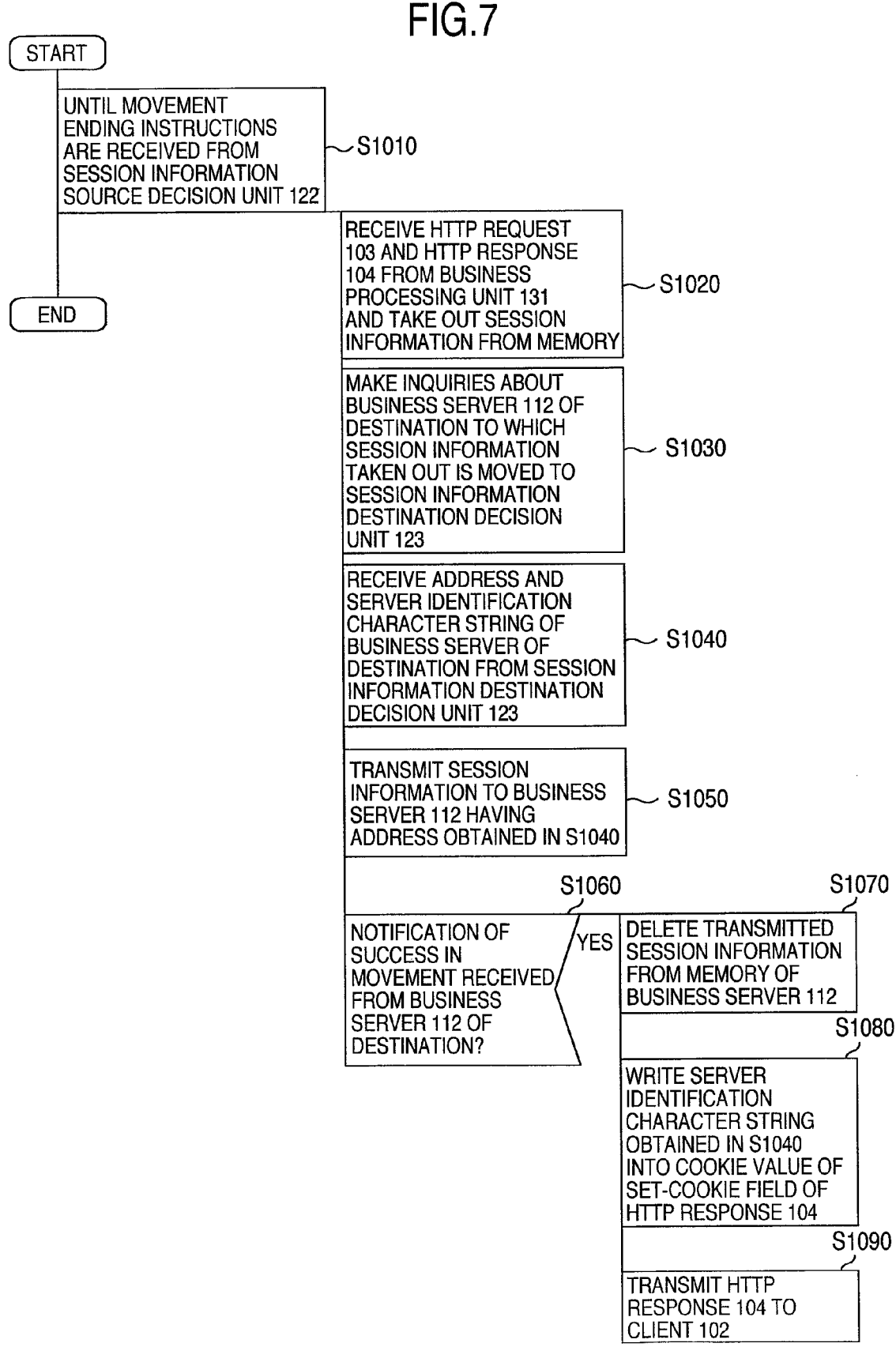
FIG. 7 is a flow chart showing an example of the processing flow of session information movement processing.

FIG. 7 is a flow chart showing a procedure of the "session information movement processing" for making the session information management unit 132 move the session information to the session information management unit 132 of another business server 112. In the description of this processing, the source of session information is described as the session information management unit 132-A and the destination thereof is described as the session information management unit 132-B.

The session information management unit 132-A starts processing in response to movement instructions from the session information source decision unit 122 and performs processing in steps S1020 to S1080 repeatedly until the session information management unit 132-A receives the movement ending instructions from the session information source decision unit 122 (step S1010). The processing is performed each time the business processing unit 131 receives the continuation HTTP request 103.

First, the session information management unit 132-A receives the HTTP request 103 and the HTTP response 104 from the business processing unit 131 and takes out the session information corresponding to the session information identifier contained in the header field of the HTTP request 103 from the memory of the business server 112 including the session information management unit itself (step S1020).

Next, the session information management unit 132-A makes inquiries about the business server 112 of destination to which the session information taken out in step S1020 is moved to the session information destination decision unit 123 (step S1030) and receives the address and the server identifier of the business server 112 of destination from the session information destination decision unit 123 (step S1040).

The session information management unit 132-A transmits the session information taken out in step S1020 to the session information management unit 132-B in the business server 112 having the address taken out in step S1040 (step S1050). When the notification of success in movement is received from the session information management unit 132-B (step S1060), the session information management unit 132-A deletes the transmitted session information from its own memory (step S1070) and writes the character string described in the request identifier field (411) of the continuation request distribution table 400 as the Cookie name and the server identification character string acquired in step S1040 as the Cookie value into the set-Cookie field (311) of the HTTP response received from the business processing unit 131 in step S1020 (step S1080). The session information management unit 132-A transmits the HTTP response 104 to the client (step S1090).

Figure 8:
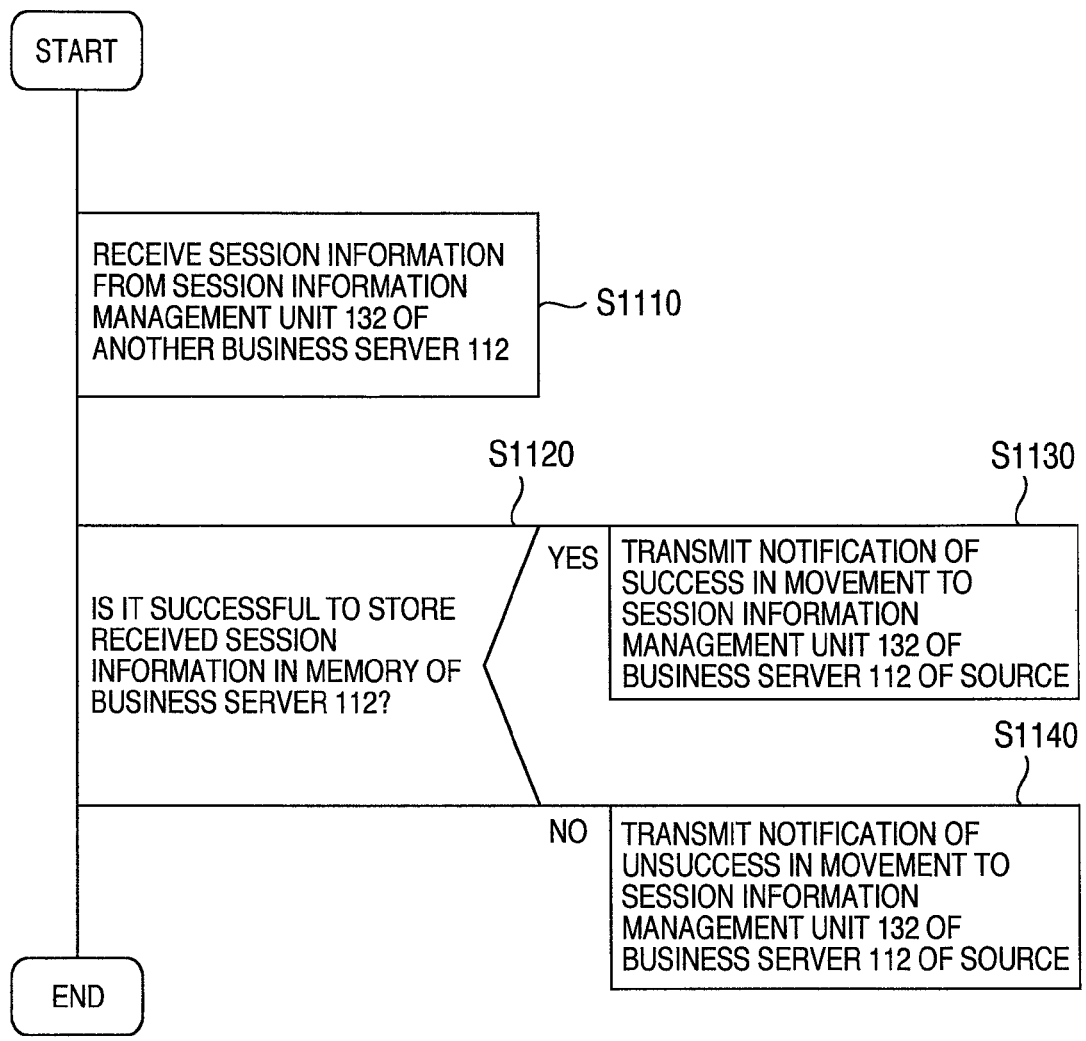
FIG. 8 is a flow chart showing an example of the processing flow of session information receiving processing.

FIG. 8 is a flow chart showing a procedure example of the "session information receiving processing" for making the session information management unit 132 receive the session information from the session information management unit 132 of another business server 112. Even in the description of this processing, the source of session information is described as the session information management unit 132-A and the destination thereof is described as the session information management unit 132-B.

When the session information management unit 132-B receives the session information from the session information management unit 132-A (step S1110), the session information management unit 132-B tries to store the session information into the memory of the business server 112 including the session information management unit itself. When it is successful to store the session information (step S1120), the session information management unit 132-B transmits notification of success in movement to the session information management unit 132-A (step S1130). When the storing of the session information is unsuccessful due to the reason that the session information having the same session identifier is already stored in the memory or the like, the session information management unit 132-B transmits notification of unsuccess in movement to the session information management unit 132-A (step S1140).

Figure 9:
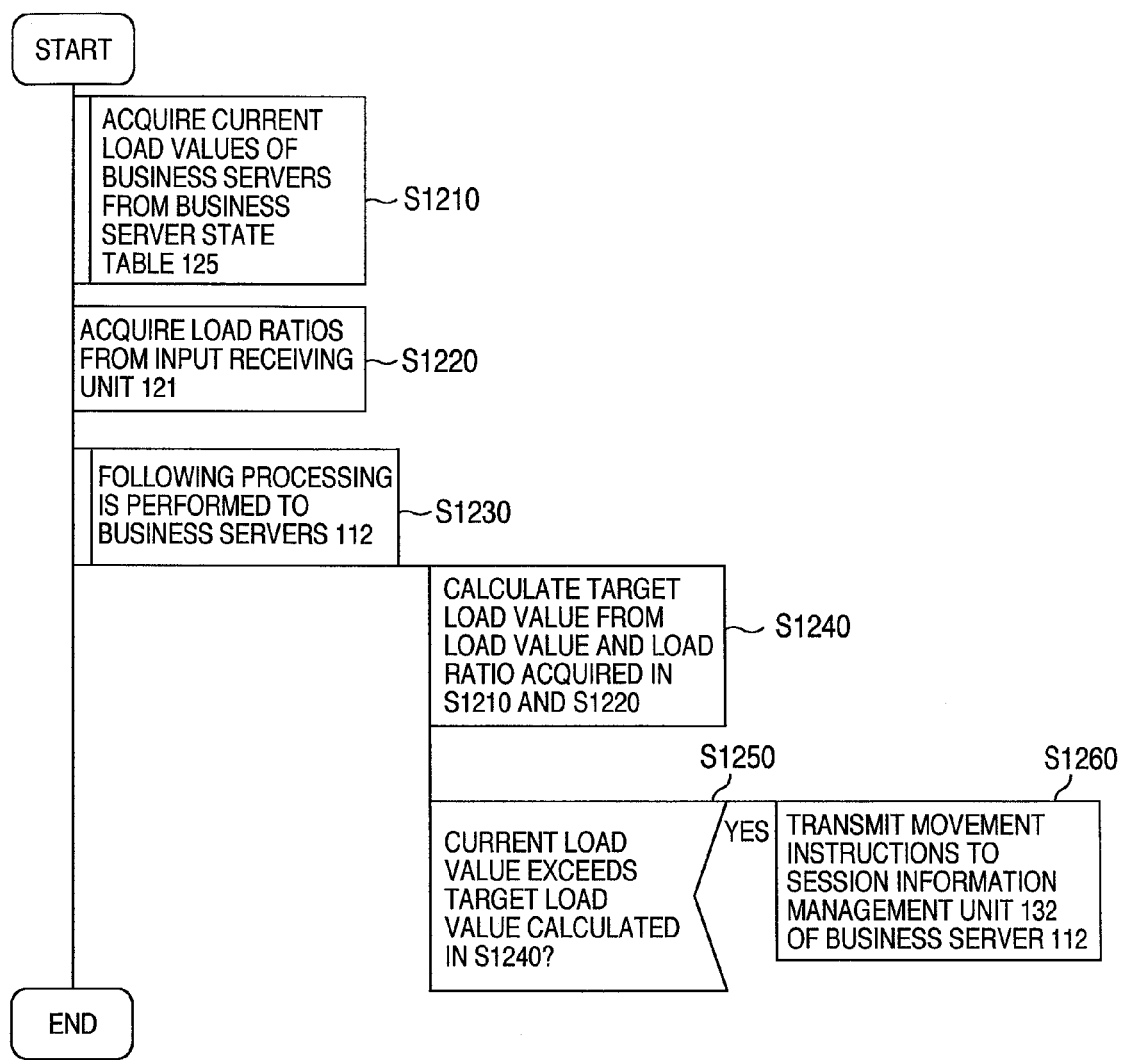
FIG. 9 is a flow chart showing an example of the processing flow of source selection processing.

FIG. 9 is a flow chart showing a procedure of the "source selection processing" for making the session information source decision unit 122 decide the business server 112 of source from which the session information is moved.

The session information source decision unit 122 acquires the current load values of the business servers from the business server state table 125 (step S1210) and further acquires the operation manager's inputted load ratios from the input receiving unit 121 (step S1220). Then, the following processing described below in steps S1240 to S1260 is performed to the business servers 112 (step S1230). In the description of this processing, the business server 112 being subjected to the processing is described as the business server 112-N.

First, the session information source decision unit 122 calculates the target load value of the business server 112-N on the basis of the load value and the load ratio of the business server 112-N acquired in steps S1210 and S1220, respectively (step S1240). When the current load value of the business server 112-N exceeds the target load value calculated in step S1240 (step S1250), the session information source decision unit 122 transmits movement instructions to the session information management unit 132 of the business server 112-N (step S1260).

Figure 10:
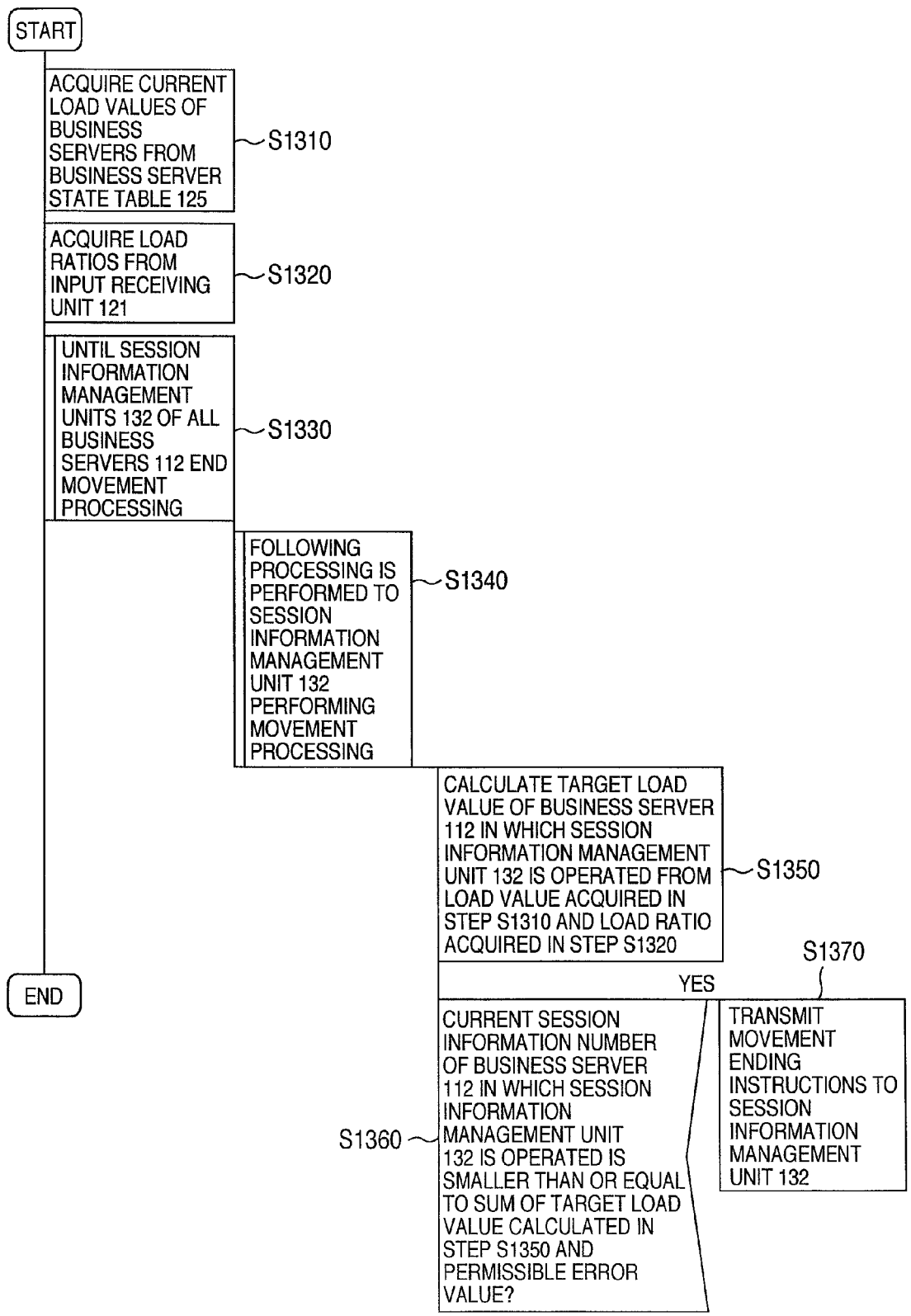
FIG. 10 is a flow chart showing an example of the processing flow of end judgment processing.

FIG. 10 is a flow chart showing a procedure example of the "end-of-movement judgment processing" for making the session information source decision unit 122 judge the end of movement for the business servers 112 to which the movement instructions are transmitted and transmit movement ending instructions to the session information management unit 132 of the business server 112 judged as end.

The session information source decision unit 122 acquires the current load values of the business servers 112 from the business server state table 125 (step S1310) and further acquires the operation manager's inputted load ratios from the input receiving unit 121 (step S1320). The session information source decision unit 122 performs the following processing described below in steps S1350 to S1370 repeatedly to the session information management unit 132 performing the movement processing (step S1340) until the session information management units 132 of all the business servers 112 end the movement processing (step S1330).

In the description of this processing, the session information management unit being subjected to the processing is described as the session information management unit 132-N. The session information source decision unit 122 calculates the target load value of the business server 112 in which the session information management unit 132-N is operated on the basis of the load value of the business server 112 acquired in step S1310 and the load ratio acquired in step S1320 (step S1350). When the load value of the business server 112 is smaller than or equal to the sum of the target load value of the business server 112 calculated in step S1350 and the permissible error value (step S1360), the session information source decision unit 122 transmits movement ending instructions to the session information management unit 132-N (step S1370).

Figure 11:
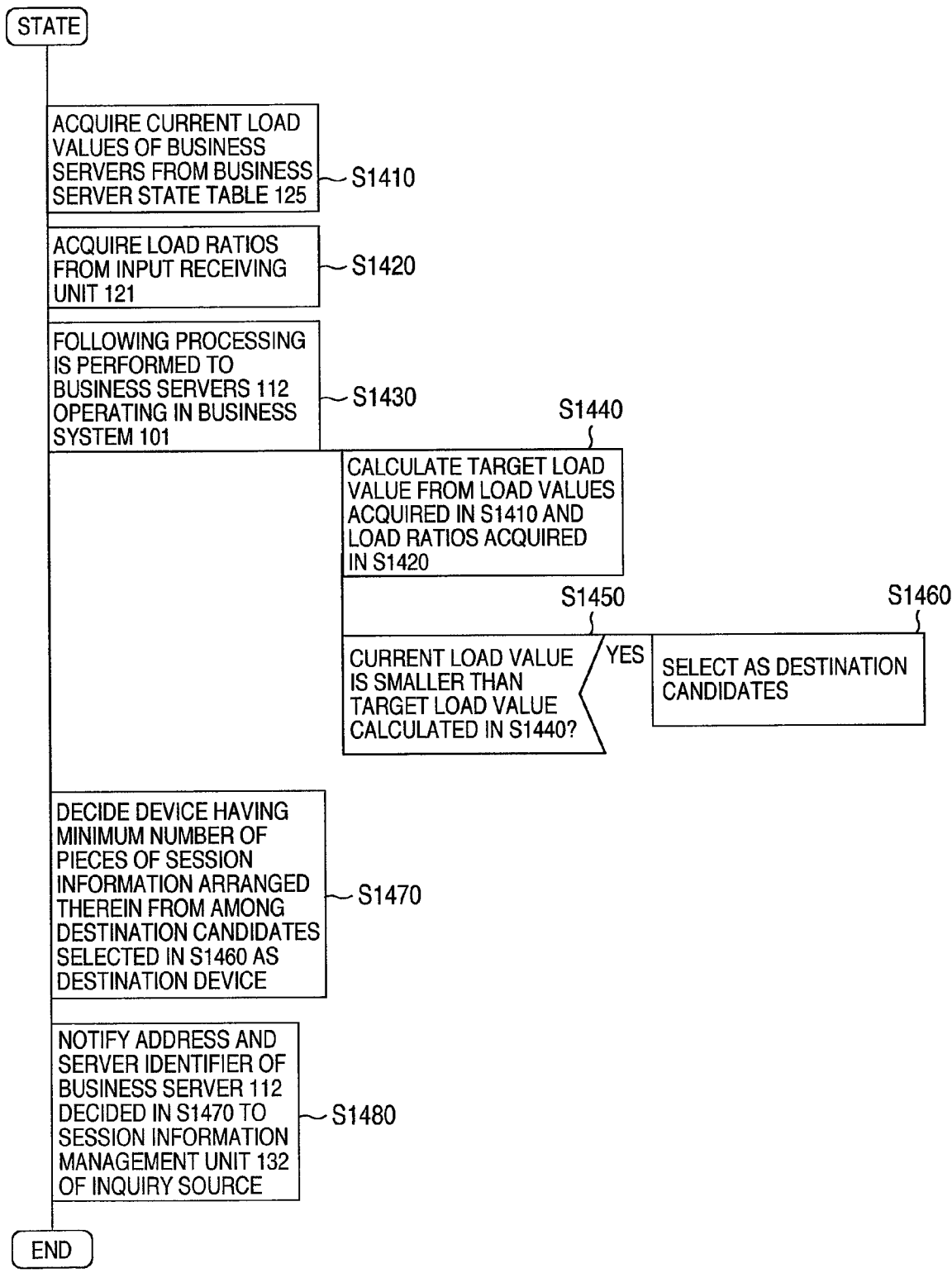
FIG. 11 is a flow chart showing an example of the processing flow of destination selection processing.

FIG. 11 is a flow chart showing a procedure of the "destination selection processing" for making the session information destination decision unit 123 decide the business server 112 of destination in response to inquiries about the destination device from the session information management unit 132 performing the movement processing and notify the address and the server identifier thereof.

When the session information destination decision unit 123 receives the inquiries about the destination device from the session information management unit 132 performing the movement processing, the session information destination decision unit 123 acquires the current load values arranged in the business servers 112 from the business server state table 125 (step S1410) and further acquires the load ratios from the input receiving unit 121 (step S1420). Then, the following processing described below in steps S1440 to S1460 is performed to the business servers 112 (step S1430).

In the description of this processing, the business server 112 being subjected to the processing is described as the business server 112-N. The session information destination decision unit 123 calculates the target load value of the business server 112-N on the basis of the load values of the business servers 112 acquired in step S1410 and the load ratios acquired in step S1420 (step S1440). When the current load value of the business server 112-N is smaller than the target load value calculated in step S1440 (step S1450), the session information destination decision unit 123 selects the business server 112-N as the destination candidate (step S1460). Then, the session information destination decision unit 123 decides the device having the minimum number of pieces of session information arranged therein from among the devices selected as the destination candidates in the processing performed to the business servers 112 in step S1460 as the destination device.

When there are a plurality of destination devices, any one of them is decided as the destination device (step S1470). The session information destination decision unit 123 transmits the address and the server identifier of the business server 112 decided in step S1470 to the session information management unit 132 that has made the inquiries about the destination device in step S1410 (step S1480).

Finally, the whole operation of the session information rearrangement processing performed by the session information management units 132 of the business servers 112, the session information source decision unit 122 and the session information destination decision unit 123 in cooperation with one another is described concretely with reference to FIGS. 12A to 13C.

The operation of rearranging the session information in order to realize uniform loads, that is, uniform session information number among business servers 112 when a business server 112 is newly increased in the business system 101 is now described using a concrete example.

Figure 12A:
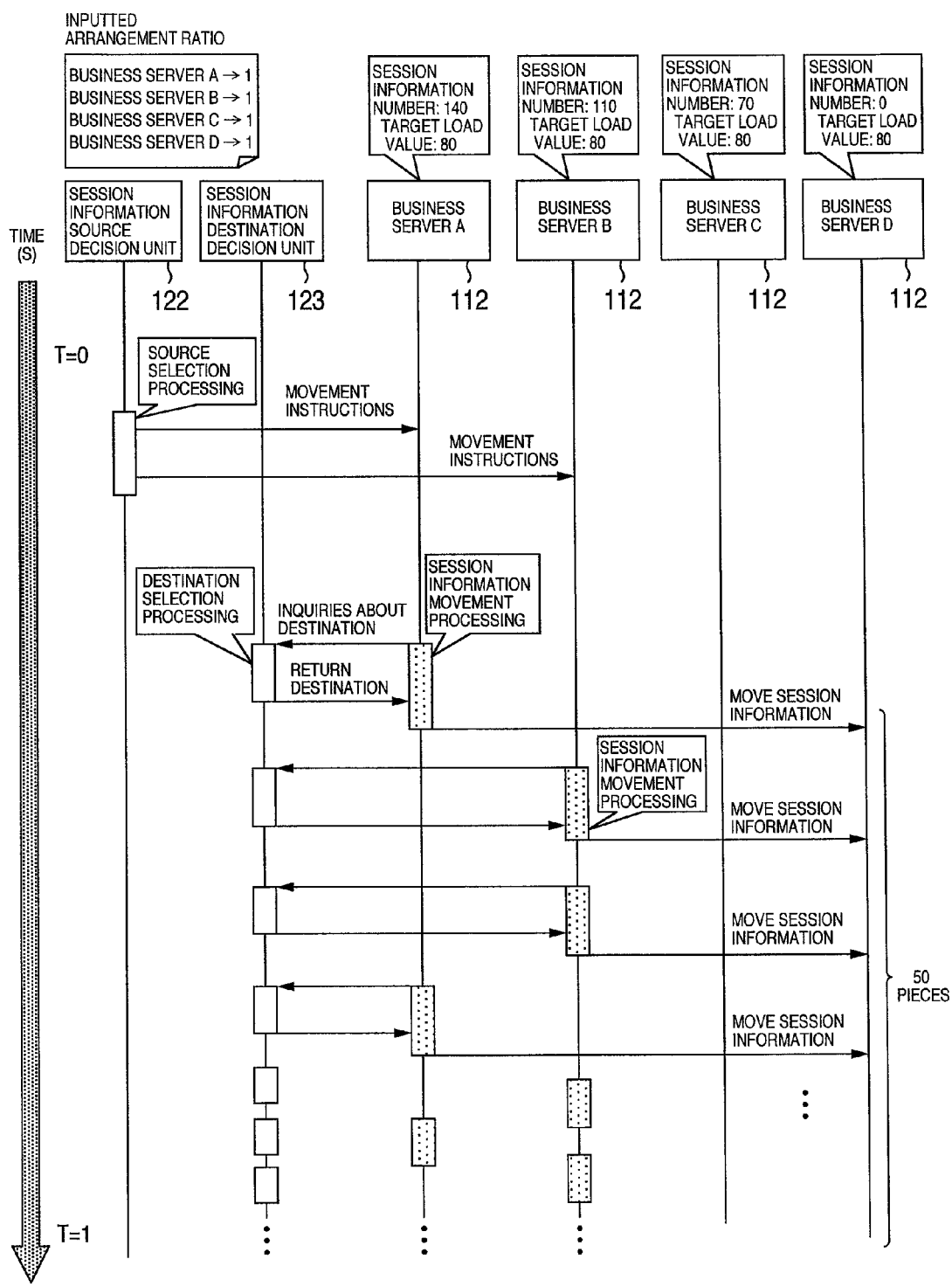
FIG. 12A is a sequence chart showing an example of the session information movement flow for balancing loads among business servers.
Figure 12B:
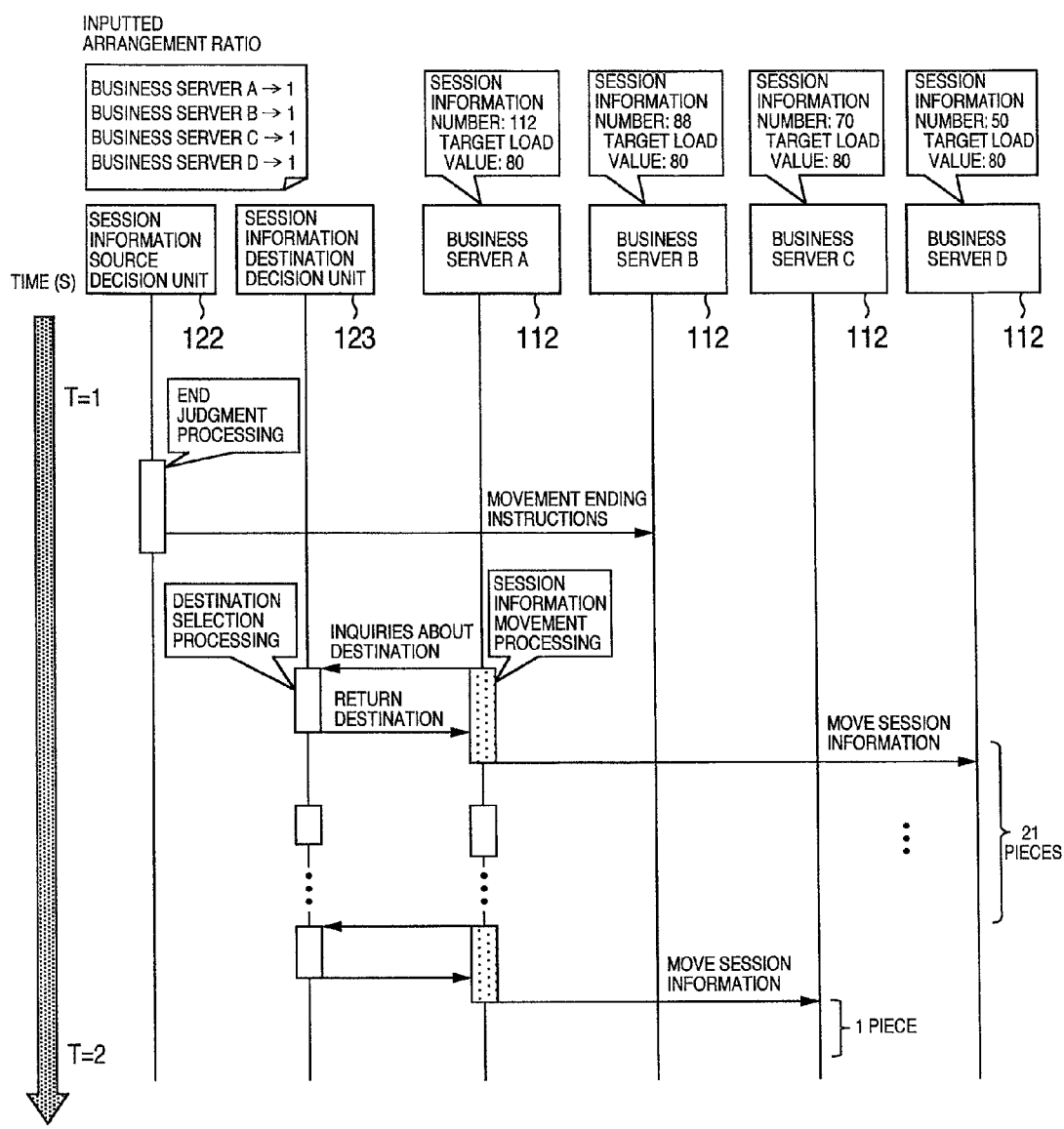
FIG. 12B is a sequence chart showing an example of the session information movement flow for balancing loads among business servers.
Figure 12C:
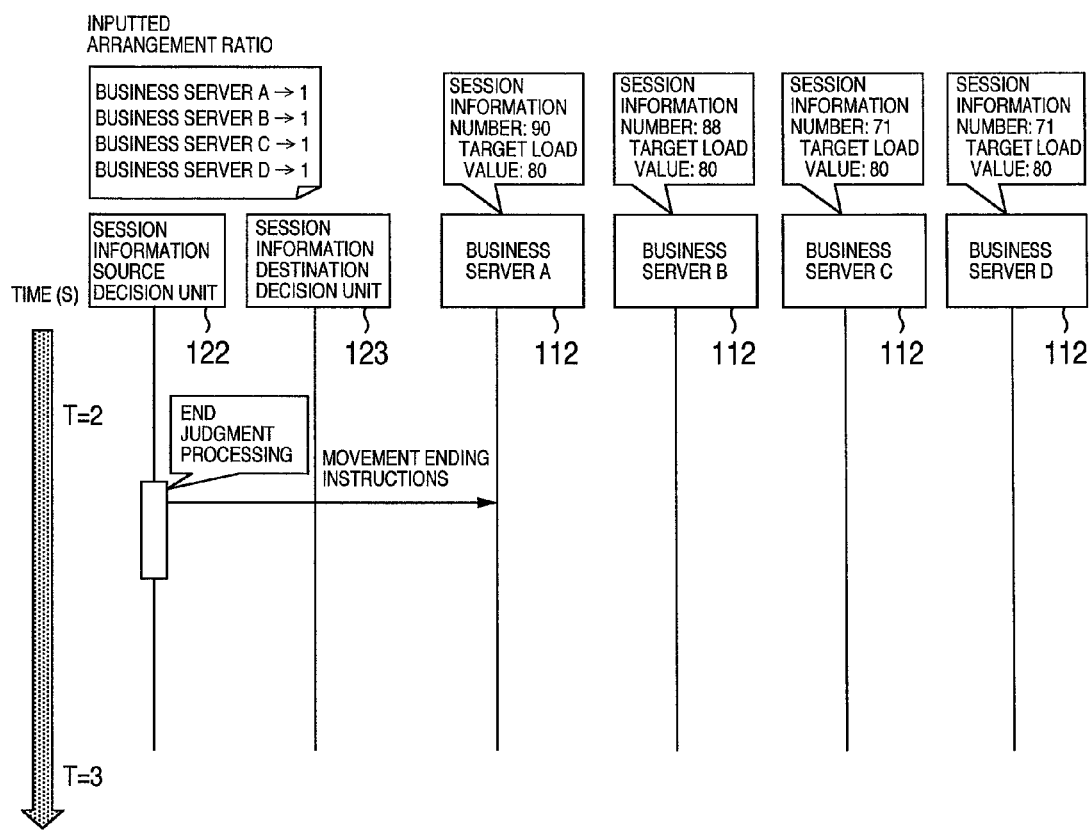
FIG. 12C is a sequence chart showing an example of the session information movement flow for balancing loads among business servers.

FIGS. 12A, 12B and 12C show an example of the rearrangement processing in case where a business server 112-D is newly added to the business system 101 including business servers 112-A, 112-B and 112-C.

It is supposed that the numbers of pieces of session information arranged previously in the business servers 112-A, 112-B, 112-C and 112-D are 140, 110, 70 and 0, respectively, and the number of continuation HTTP requests transmitted to each business server 112 per second is 20% of the number of pieces of session information arranged in the business server 112.

For example, it is supposed that 140×0.2=28 HTTP requests per second are issued or transmitted to the business server 112-A (session information number=140). It is supposed that any new HTTP request 103 is not generated for simplification of description.

The permissible error value is 15% of the target load value of each business server 112. For example, when the number of pieces of session information of the business server 112-A performing the movement processing currently is 90 and the target load value thereof 80, the permissible error value is calculated to be 80×0.15=12 and since the current number of pieces of session information (=90) is smaller than or equal to the sum of the target load value and the permissible error value (90+12=92), the session information source decision unit 122 transmits the movement ending instructions to the session information management unit 132 of the business server 112-A.

The end-of-movement judgment processing of the session information source decision unit 122 is performed repeatedly at intervals of one second. Further, it is supposed that the business server monitoring unit 133 of the business server 112 transmits the load information to the business server management unit 124 each time the number of pieces of session information arranged therein is varied and the business server management unit 124 updates the business server state table 125 at the timing that the business server management unit 124 receives the load information from the business server monitoring unit 133.

When the operation manager inputs 1:1:1:1 as the load ratios by means of the input receiving unit 121 and depresses the OK button 513, the rearrangement processing is started. The time that the rearrangement processing is started is supposed to be 0.

FIG. 12A shows the processing flow during the period T=0 to 1 (second), FIG. 12B during the period T=1 to 2 (second) and FIG. 12C during the period T=2 to 3 (second). Referring first to FIG. 12A, the processing flow performed during the period T=0 to 1 (second) is described.

After the rearrangement instructions are issued by the operation manger, the session information source decision unit 122 performs the source device selection processing. In the source device selection processing, since the device having the target load value of the business server 112 smaller than the number of pieces of session information arranged therein is decided as the source, the business servers 112-A (session information number: 140, target load value: 80) and 112-B (session information number: 110, target load value: 80) are decided as the source devices and the movement instructions are transmitted to the business servers 112.

The session information management units 132 of the business servers 112-A and 112-B perform the movement processing of session information set in the HTTP requests at the timing that the business processing to the continuation HTTP requests is performed.

The number of continuation HTTP requests transmitted to the business server 112-A during the period T=0 to 1 (second) is 140×0.2=28 and accordingly 28 pieces of session information are moved. Similarly, for the business server 112-B, 110×0.2=22 pieces of session information are moved. In the movement processing, the session information management unit 132 makes inquiries about the destination devices to the session information destination decision unit 123.

The session information destination decision unit 123 performs the destination device selection processing when the session information destination decision unit 123 receives the inquiries about the destination devices. In the destination device selection processing, the devices having the number of pieces of session information arranged in the business server 112 that is smaller than its own target load value are selected as session information destination candidates. In this example, the business servers 112-C (session information number: 70, target load value: 80) and 112-D (session information number: 0, target load value: 80) are selected as the destination candidates. Since the business server 112 having the minimum number of pieces of session information arranged therein is selected from among the candidates as the destination, responses to the effect that the business server 112-D is the destination are returned in response to all inquiries about the destination during the period T=0 to 1 (second).

Namely, in this example, 50 pieces of session information in total including 28 pieces from the business server 112-A and 22 pieces from the business server 112-B are moved to the business server 112-D.

FIG. 12B shows the processing flow during the period T=1 to 2 (second).

The session information source decision unit 122 performs the end-of-movement judgment processing at intervals of one second. In this processing, the movement ending instructions are transmitted to the business server 112 having the number of pieces of session information arranged therein smaller than or equal to the sum of the target load value and the permissible error value from among the business servers 112 performing the movement processing.

In this example, the movement ending instructions are transmitted to the business server 112-B. The reason thereof is that the number of pieces of session information arranged in the business server 112-B is 88 and is smaller than the sum (80+12=92) of the target load value (=80) and the permissible error value (80×0.15=12). The business server 112-B that has received the movement ending instructions ends the movement processing.

On the other hand, the business server 112-A continuously performs the movement processing of session information. During the time T=1 to 2 (second), since 112×0.2≈22 continuation HTTP requests 103 are transmitted to the business server 112-A, the movement processing of session information is performed 22 times. In the same manner as above, the session information destination decision unit 123 decides the business server 112 of destination in response to the inquiries of the source device for the movement processing.

In this example, the business servers 112-C and 112-D are selected as destination candidates. The numbers of pieces of session information arranged in the business servers are 70 and 50, respectively, and accordingly responses to the effect that the business servers 112-D is the destination are returned in response to the first 20 inquiries about destinations. Responses to the effect that the business servers 112-D and 112-C are the destinations are returned in response to the next 2 inquiries about the destinations.

Namely, in this example, one piece of session information is moved to the business server 112-C and 20+1=21 pieces of session information are moved to the business servers 112-D.

FIG. 12C shows the processing flow during the period T=2 to 3 (second).

The session information source decision unit 122 performs the end-of-movement judgment processing and transmits the movement ending instructions to the business server 112-A. The reason thereof is that the number of pieces of session information arranged in the business server 112-A is 90 and is smaller than or equal to the sum (80+14=94) of the target load value (=80) and the permissible error value (90×0.15≈14). The business server 112-A that has received the movement ending instructions ends the movement processing.

At this point, since all of the business servers 112 to which the movement instructions have been transmitted end the movement processing, the rearrangement processing is ended.

The foregoing is the processing flow of rearranging the session information in the business servers 112 uniformly.

The rearrangement processing in case where one business server 112 is shut off by the business system 101 is now described.

Figure 13A:
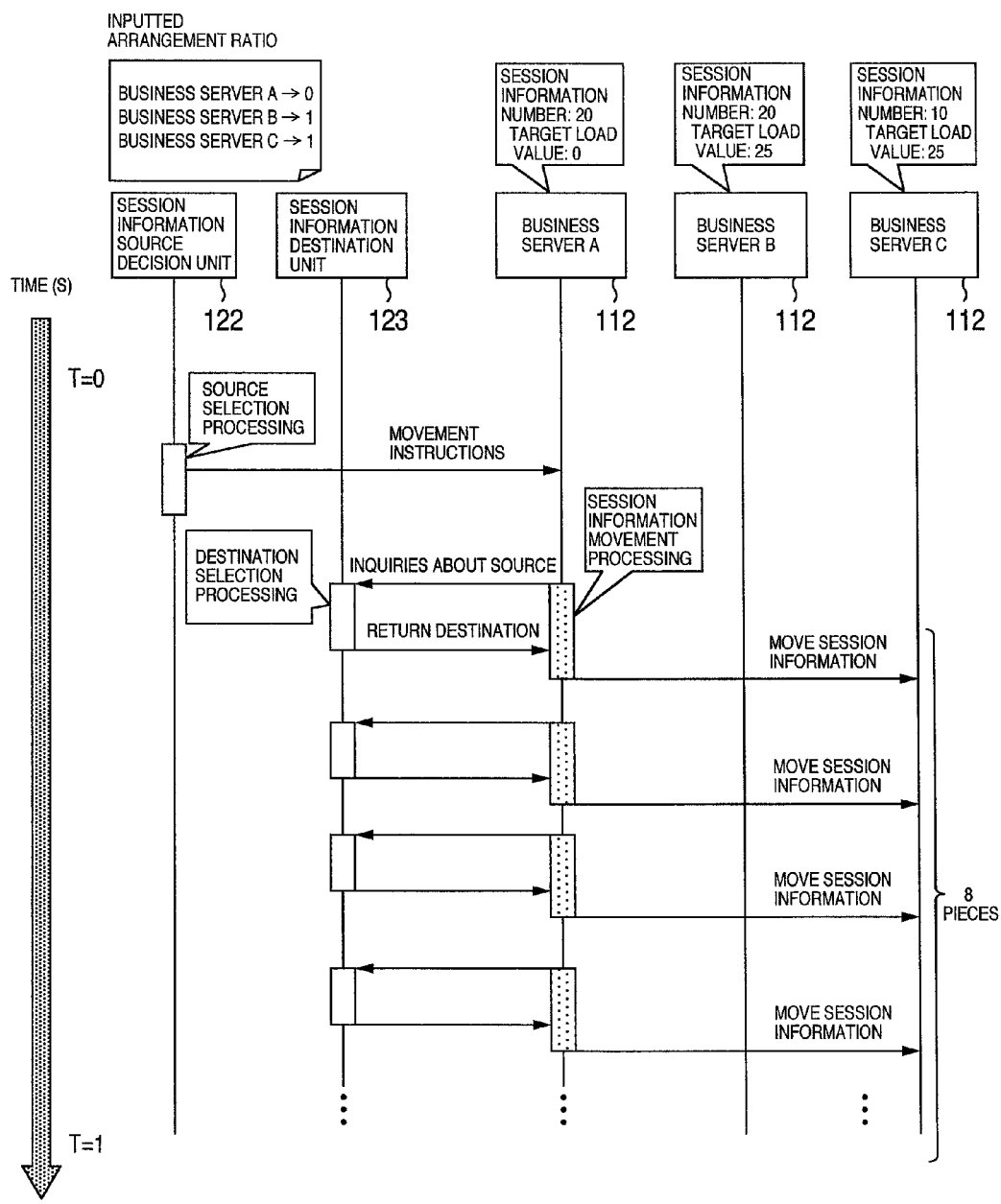
FIG. 13A is a sequence chart showing an example of the session information movement flow for shutting off a specific business server.
Figure 13B:
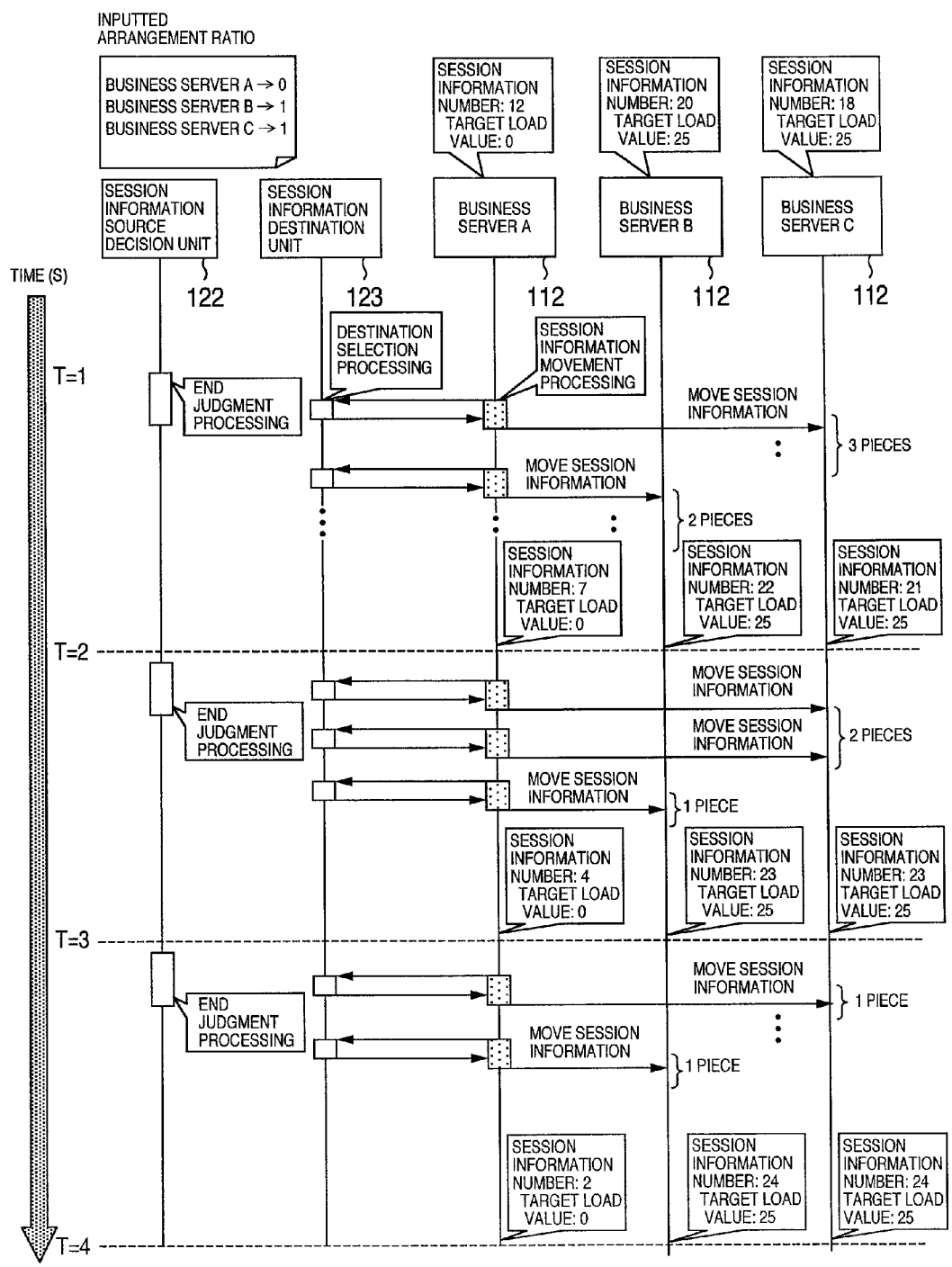
FIG. 13B is a sequence chart showing an example of the session information movement flow for shutting off a specific business server.
Figure 13C:
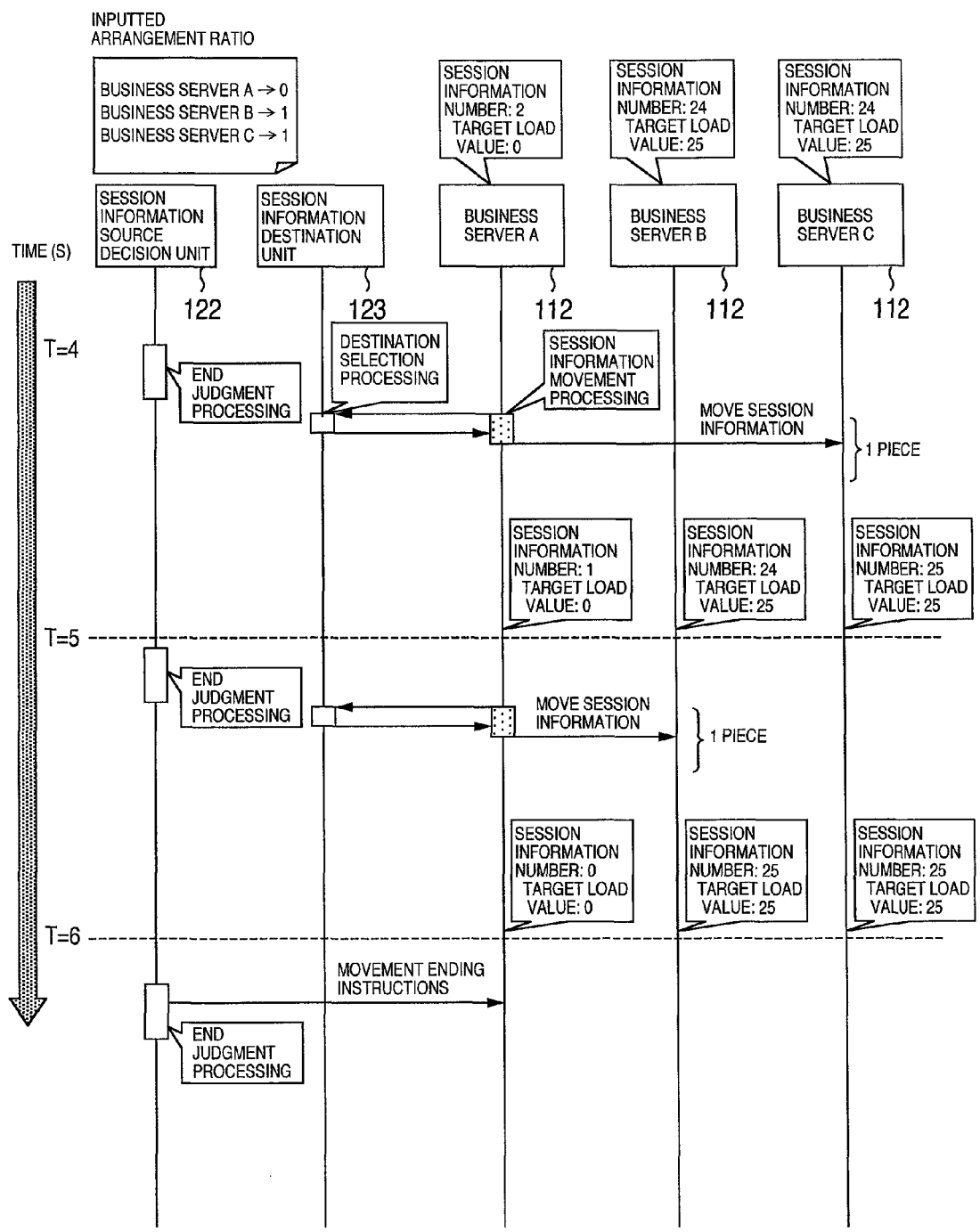
FIG. 13C is a sequence chart showing an example of the session information movement flow for shutting off a specific business server.

FIGS. 13A, 13B and 13C show an example of the rearrangement processing in case where the business server 112-A is shut off in the business system 101 including the business servers 112-A, 112-B and 112-C.

It is supposed that the numbers of pieces of session information arranged previously to the business servers 112-A, 112-B and 112-C are 20, 20 and 10, respectively, and the number of continuation HTTP requests transmitted to the business server 112 per second is 40% of the number of pieces of session information arranged in the business server 112. Further, it is supposed that any new HTTP request 103 is not generated for simplification of description.

The permissible error value is 15% of the target load value of the business server 112 and the end judgment processing of the session information source decision unit 122 is performed repeatedly at intervals of one second. Further, it is supposed that the business server monitoring unit 133 of the business server 112 transmits the load information to the business server management unit 124 each time the number of pieces of session information arranged therein is varied and the business server management unit 124 updates the business server state table 125 at the timing that the business server management unit 124 receives the load information from the business server monitoring unit 133.

When the operation manager inputs 0:1:1 as the load ratios by means of the input receiving unit 121 and depresses the OK button 513, the rearrangement processing is started. The time that the rearrangement processing is started is 0 in the same manner as above.

FIG. 13A shows the processing flow during the period T=0 to 1 (second).

After the rearrangement instructions are issued by the operation manger, the session information source decision unit 122 performs the source device selection processing. In this example, the business server 112-A (session information number: 20, target load value: 0) having the target load value smaller than the number of pieces of session information arranged therein is decided as the source and the movement instructions are transmitted to the business server 112.

The session information management unit 132 of the business server 112-A performs the movement processing of session information set in the HTTP requests 103 at the timing that the business processing to the continuation HTTP requests is performed.

The number of continuation HTTP requests transmitted to the business server 112-A during the period T=0 to 1 (second) is 20×0.4=8 and accordingly 8 pieces of session information are moved. In the movement processing, the session information management unit makes inquiries about the destination device to the session information destination decision unit 123. The session information destination decision unit 123 performs the session information destination selection processing when the session information destination decision unit 123 receives the inquiries about destination from the session information management unit 132.

In this example, the business servers 112-B (session information number: 20, target load value: 25) and 112-C (session information number: 10, target load value: 25) having the number of pieces of session information arranged therein smaller than the target load value are selected as the destination devices. Since the business server 112 having the minimum number of pieces of session information arranged therein is decided as the destination from among the destination candidates, responses to the effect that the business server 112-C is the destination are returned in response to all inquiries about the destination during the period T=0 to 1 (second). That is, in this processing, 8 pieces of session information are moved from the business server 112-A to the business server 112-C.

FIG. 13B shows the processing flow during the period T=1 to 4 (second).

During the period T=1 to 4 (second), the session information source decision unit 122 performs the end-of-movement judgment processing at intervals of one second, although the session information source decision unit 122 does not transmits the movement ending instructions to the session information management unit 132 of the business server 112-A during this period. The reason thereof is that the sum of the permissible error value (0×0.15=0) and the target load value (=0) of the business server 112-A is 0 and accordingly the movement processing is performed until the number of pieces of session information arranged reaches 0.

During the period T=1 to 2 (second), 12×0.4≈5 continuation HTTP requests are transmitted to the business server 112-A and the movement processing is performed 5 times. When the session information destination decision unit 123 receives the inquiries about the destination device transmitted in the movement processing, the session information destination decision unit 123 performs the destination selection processing and selects the business servers 112-B (session information number: 20, target load value: 25) and 112-C (session information number: 18, target load value: 25) as destination candidates.

At the time T=1 (second), since the numbers of pieces of session information of the business servers 112-B and 112-C are 20 and 18, respectively, responses to the effect that the business server 112-C is the destination are returned in response to the first 2 inquiries. The numbers of pieces of session information of the business servers 112-B and 112-C at this time are both 20.

It is supposed that responses to the effect that the business servers 112-C, 112-C and 112-B are the destinations are returned in response to the next 3 inquiries, respectively. That is, during the period T=1 to 2 (second), 2 pieces of session information are moved to the business server 112-B and 3 pieces of session information are moved to the business server 112-C.

During the period T=2 to 3 (second), 7×0.4≈3 continuation HTTP requests are transmitted to the business server 112-A and the movement processing is performed 3 times. When the session information destination decision unit 123 receives the inquiries about the destination transmitted in the movement processing, the session information destination decision unit 123 performs the destination selection processing and selects the business servers 112-B (session information number: 22, target load value: 25) and 112-C (session information number: 21, target load value: 25) as destination candidates.

At the time T=2 (second), since the numbers of pieces of session information of the business servers 112-B and 112-C are 22 and 21, respectively, response to the effect that the business server 112-C is the destination is returned in response to the first inquiries. The numbers of pieces of session information of the business servers 112-B and 112-C at this time are both 22.

Responses to the effect that the business servers 112-C and 112-B are the destinations are returned in response to the next 2 inquiries, respectively. That is, during the period T=2 to 3 (second), 1 piece of session information is moved to the business server 112-B and 2 pieces of session information are moved to the business server 112-C.

During the period T=3 to 4 (second), 4×0.4≈2 continuation HTTP requests are transmitted to the business server 112-A and the movement processing is performed 2 times. When the session information destination decision unit 123 receives the inquiries about the destination transmitted in the movement processing, the session information destination decision unit 123 performs the destination selection processing and selects the business servers 112-B (session information number: 23, target load value: 25) and 112-C (session information number: 23, target load value: 25) as destination candidates.

At the time T=3 (second), since the numbers of pieces of session information of the business servers 112-B and 112-C are both 23, responses to the effect that the business servers 112-C and 112-B are the destinations are returned in response to the 2 inquiries.

FIG. 13C shows the processing flow during the period T=4 to 6 (second).

During the period T=4 to 5 (second), 2×0.4≈1 continuation HTTP request is transmitted to the business server 112-A and the movement processing is performed one time. When the session information destination decision unit 123 receives the inquiries about the destination transmitted in the movement processing, the session information destination decision unit 123 performs the destination selection processing and selects the business servers 112-B (session information number: 24, target load value: 25) and 112-C (session information number: 24, target load value: 25) as destination candidates.

At the time T=4 (second), since the numbers of pieces of session information of the business servers 112-B and 112-C are both 24, response to the effect that the business server 112-C is the destination is returned in response to 1 inquiry.

During the period T=5 to 6 (second), one continuation HTTP request is transmitted to the business server 112-A and the movement processing is performed one time. When the session information destination decision unit 123 receives the inquiries about the destination transmitted in the movement processing, the session information destination decision unit 123 performs the destination selection processing and selects the business servers 112-B (session information number: 24, target load value: 25) and 112-C (session information number: 25, target load value: 25) as destination candidates.

At the time T=5 (second), since the numbers of pieces of session information of the business servers 112-B and 112-C are 24 and 25, respectively, response to the effect that the business server 112-B is the destination is returned in response to 1 inquiry.

At the time T=6 (second), since the number of pieces of session information of the business server 112-A reaches 0 in the end-of-movement judgment processing performed by the session information source decision unit 122, the movement ending instructions are transmitted to the session information management unit 132 of the business server 112.

At this point, since all of the business servers 112 to which the movement instructions have been transmitted end the movement processing, the rearrangement processing is ended. The foregoing is the processing flow of rearranging the session information when the specific business server 112 is shut off.

The embodiment has been described as above. According to the embodiment, the session information set in the continuation request can be moved to another business server and the server identifier of the destination device can be embedded in the HTTP response header to the continuation request to thereby realize switching of the destination business server to the continuation request by the load balancer.

By utilizing this switching function, for example, when loads are inclined or imbalanced among the business servers, the session information can be rearranged at proper ratios to thereby distribute loads to the continuation requests uniformly.

Further, when a specific business server is desired to be shut off, all session information of the business server can be moved to another business server and the continuation HTTP requests set in the session information are switched to be transferred to the business server of destination, so that the business server can be shut off without losing the session information.

According to the embodiment, in the business system in which the stateful business service treating the session information is operated and the layer 7 persistence is utilized to balance loads, when the loads are inclined or imbalanced among the plurality of business servers, the business server of destination to which the continuation request is transferred can be switched to thereby realize uniform loads. Particularly, when an apparatus is newly increased due to the reason that loads on the whole business system are increased or the like, the continuation requests transferred to the existing apparatus can be switched to be transferred to the increased apparatus, so that the loads on the existing apparatus can be reduced. In addition, when a specific apparatus is shut off, all the continuation requests transferred to the apparatus to be shut off can be switched to be transferred to another apparatus, so that the shut off time can be shortened without losing the session information.

In the load balancing method for the continuation requests transmitted from the client in the business system including the plurality of business servers and the load balancer, after the business server executes the business processing for the continuation requests, the session information set in the continuation request is moved to another business server and the character string for identifying the business server of destination is embedded in the response to the continuation request to return the response to the client, so that the business server of destination to which the subsequent continuation requests are transferred can be switched.

Further, in the operation management system including monitoring means for monitoring loads on the plurality of business servers, storage means for storing the loads on the business servers by the monitoring means, control processing means for deciding the business servers of source and destination of the session information and input receiving means for receiving load ratios from the operation manager, the control processing means decides the business servers of source and destination of the session information on the basis of the loads on the plurality of business servers stored in the storage means and the load ratios inputted from the input receiving means by the operation manager and issues movement instructions to the decided business servers, so that the continuation requests are switched to be transferred to the business servers of destination so that the loads among the business servers are shifted to satisfy the load ratios inputted by the operation manger.

The embodiment can be applied to the blade server, for example. The blade server includes a plurality of servers mounted in one housing. Concretely, CPU and memory are mounted in one board to have the same function as a single server and a plurality of boards are inserted or mounted in the housing to thereby realize the blade server. The blade server has the merits that the number of servers mounted in a unit area can be increased as compared with conventional servers and further the weight and the power consumption can be reduced greatly.

In the example where the embodiment is applied to the blade server, the information system 101 is constituted by a single blade server and each business server 112 is constituted by a board mounted or inserted in the housing where the blade server is constituted. The load balancer 111 may be an apparatus different from the blade server or may be constituted by software installed in a single board. Similarly, the operation management apparatus 106 may be an apparatus different from the blade serve or may be constituted by a single board.

As an embodiment to be supposed, when loads on boards being operated currently are increased, a standby board that is not operated is started and the operation manager issues rearrangement instructions to the board by means of the input receiving unit 121. The subsequent operation of the session information rearrangement processing is the same as that of the embodiment.

In addition, the embodiment can be applied to a virtual machine. The virtual machine is software for performing the emulation of hardware (CPU, memory and devices) and capable of performing the same processing (for example, OS) as that of the real machine. Hardware for operating a plurality of virtual machines is named a host computer. Typically, the plurality of virtual machines are operated in a single host computer and middleware for the business server is installed in each virtual machine.

The application to the virtual machine has the merits of reducing the space, the weight and the power consumption in the same manner as the blade server described above.

In the example where the embodiment is applied to the virtual machine, the information system 101 is constituted by a single host computer and each business server 112 is constituted by a virtual machine operating in the host computer. The load balancer 111 may be an apparatus different from the host computer or may be constituted by software installed in a single virtual machine.

In case of Web serve, for example, when loads on the Web server are increased and exceed a predetermined threshold, the Web server is scaled out and new virtual Web server is prepared. The load balancing according to the embodiment for moving session information is performed to thereby balance the loads even on the new Web server uniformly. In this case, the operation management apparatus transmits movement instructions of session information in accordance with increase of the new Web servers.

Further, when loads on the plurality of Web servers are reduced as a whole and the whole loads are lighter than the predetermined threshold, movement of session information in the embodiment is performed to issue session information movement instructions so that session information in one Web server is reduced to zero. Consequently, the Web server having the session information reduced to zero and not performing processing is scaled in to be deleted, so that computer resources can be utilized effectively.

Similarly, the operation management apparatus 106 may be constituted by an apparatus different from the host computer or may utilize a virtual machine. As an embodiment to be supposed, when loads on the virtual machine currently operating are increased, the operation manager installs a virtual machine in the host computer newly and installs or loads middleware for business server in the virtual machine to thereby cope with the increased loads. Then, rearrangement instructions are issued by means of the input receiving unit 121. The subsequent operation of the session information rearrangement processing is the same as that of the embodiment.

Further, in the embodiment, it is supposed that only a business application is operated in the business processing unit 131, although a plurality of business applications are operated in the business processing unit 131 and when loads are increased, an apparatus in which only a specific business application of them is operated can be increased.

For example, applications "AP1" and "AP2" are operated in the business processing unit 131 of the business server 112 and when the business server 112 in which only the application "AP1" is operated is increased newly since requests to the application "AP1" are increased, the session information management unit 132 performs movement processing of session information for the application "AP1" only when request to the application "AP1" is issued to the existing business server 112.

Further, all of the functions of the operation management apparatus may be provided in the load balancer. When the number of sessions is utilized as the load value, there is the merit that the number of sessions to each business server may be managed by the load balancer itself and the load information is not required to be collected from each business server.

Moreover, in the embodiment, the requests from the client 102 are not limited to the HTTP requests. Any request may be applicable as far as the server identification character string for identifying the server by the load balancer 112 and the identification character string for identifying the session information by the business processing unit 131 are contained in the request and the server identification character string can be rewritten by the session information management unit 132.

Further, the load balancer 111 may be hardware dedicated to the load balancing but may be realized by software such as a proxy server for transferring requests.

According to the embodiment, in the business system in which the stateful business service treating the session information is operated and the layer 7 persistence is utilized to balance loads, when the loads are inclined or imbalanced among the plurality of business servers, the loads can be distributed uniformly.

Particularly, when an apparatus is newly increased due to the reason that loads on the whole business system are increased or the like, the continuation requests transferred to the existing apparatus can be switched to be transferred to the increased apparatus, so that the loads on the existing apparatus can be reduced. In addition, when a specific apparatus is desired to be shut off, the shutting off operation can be completed within the session time-out without losing the session information.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A load balancing method in a load balancing system including a request transmission apparatus for specifying a computer performing processing on the basis of an identifier contained in a received continuation request, the identifier identifying a computer for processing the continuation request and transmitting the continuation request to the specified computer, a plurality of computers for performing processing in accordance with the continuation request and a management apparatus, comprising the steps of:

specifying, at the management apparatus, a first computer;
transmitting session movement instructions to the specified first computer;
receiving information, at the first computer that has received the session movement instructions, for specifying a second computer of destination from the management apparatus;
producing a processing response containing information for identifying the second computer by said request transmission apparatus on the basis of the information for specifying the second computer in response to the continuation request received from a client to transmit the processing response to the client;
transmitting session information for the client acquired from a storage unit to the second computer;
receiving the session information at the second computer;
storing the session information in a storage unit; and
executing the processing using the session information received at the second computer in response to the continuation request transmitted from the request transmission apparatus and containing the information for identifying the second computer from the client on the basis of the information for identifying the second computer,
wherein the processing response is arranged to be generated by the first computer, wherein the request transmission apparatus is arranged to select the second computer according to the continuation request, and wherein processing for the continuation request is arranged to be distributed to the second computer.

2. A load balancing method in a load balancing system according to claim 1, wherein
the step of specifying the first computer of source comprises a step of specifying a computer having a load thereon that satisfies predetermined condition from among the plurality of computers as the first computer of source.

3. A load balancing method in a load balancing system according to claim 1, further comprising a step of specifying a computer having a lightest load thereon from among the plurality of computers as the second computer of destination.

4. A load balancing method in a load balancing system according to claim 1, wherein
load on the computer relates to a number of sessions of the computer, and
when ratios in the numbers of sessions among the plurality of computers satisfy a predetermined condition, the management apparatus transmits movement instructions for moving the session information so that the numbers of sessions among the plurality of computers are distributed substantially uniformly.

5. A load balancing method in a load balancing system according to claim 1, wherein
the management apparatus collects load information from the plurality of computers to calculate an average value of loads on the plurality of computers, and
decides one or a plurality of computers having load values exceeding the average value as source computer,
the management apparatus decides one or a plurality of computers having load values smaller than the average value as destination computer and
transmitting movement instructions for moving the session information.

6. A load balancing method in a load balancing system according to claim 1, wherein
the management apparatus has a target load value for each of the plurality of computers and decides one or a plurality of computers having load values exceeding the target load values therefor as source computer, and wherein
the management apparatus decides one or a plurality of computers having load values smaller than the target load values therefor as destination computer and transmits movement instructions for moving the session information.

7. A load balancing method in a load balancing system according to the claim 1, wherein
the computer includes a virtual machine and
the management apparatus decides a virtual machine that is scaled out to be added newly in accordance with scaling out of the virtual machine as the second computer of destination, and
transmits movement instructions for moving the session information.

8. A load balancing method in a load balancing system according to claim 1, wherein
the processing response includes an HTTP response, and
the information for identifying the second computer is stored in a Cookie area of the HTTP response to thereby produce the processing response containing the information for identifying the second computer.

9. A load balancing method in a load balancing system according to claim 1, wherein the computer constitutes a blade of a blade server and the plurality of computers constitute a blade server composed of a plurality of blades.

10. A load balancing system including a request transmission apparatus for specifying a computer performing processing on the basis of an identifier contained in a received continuation request and transmitting the continuation request to the specified computer, the identifier identifying a computer for processing the continuation request, a plurality of computers for performing processing in accordance with the continuation request and a management apparatus, wherein
the management apparatus includes:
a session information source decision unit for specifying a first computer of source to transmit session movement instructions to the specified first computer,
the first computer includes:
a session information management unit for receiving information for specifying a second computer of destination from the management apparatus and transmitting session information for a client acquired from a storage unit to the second computer, and
a business processing unit for producing a processing response containing information for identifying the second computer by said request transmission apparatus on the basis of the information for specifying the second computer in response to the continuation request received from the client to transmit the processing response to the client, and
the second computer includes:
a storage unit for storing session information received from the first computer and a processing unit for executing the processing using the session information received at the second computer in response to the continuation request transmitted from the request transmission apparatus and containing the information for identifying the second computer from the client on the basis of the information for identifying the second computer, and
wherein the processing response is arranged to be generated by the first computer, wherein the request transmission apparatus is arranged to select the second computer according to the continuation request, and wherein processing for the continuation request is arranged to be distributed to the second computer.

11. A load balancing system according to claim 10, wherein
the session information source decision unit specifies a computer having a load thereon that satisfies a predetermined condition from among the plurality of computers as the first computer of source.

12. A load balancing system according to claim 10, wherein
the session information source decision unit specifies a computer having a lightest load thereon from among the plurality of computers as the second computer of destination.

13. A load balancing system according to claim 10, wherein
a load on the computer is the number of sessions of the computer and
when ratios in the numbers of sessions among the plurality of computers satisfy a predetermined condition, the session information source decision unit transmits movement instructions for moving the session information so that the numbers of sessions among the plurality of computers are distributed substantially uniformly.

14. A load balancing system according to claim 10, wherein
the session information source decision unit collects load information from the plurality of computers to calculate an average value of loads on the plurality of computers and decides one or a plurality of computers having load values exceeding the average value as the source computer, and wherein
the session information source decision unit transmits movement instructions for moving the session information, and
the session information destination decision unit decides one or a plurality of computers having load values smaller than the average value as the destination computer.

15. A load balancing system according to claim 10, wherein
the storage unit of the management apparatus stores information representing a target load value for each of the plurality of computers, and
the session information source decision unit decides one or a plurality of computers having load values exceeding the target load values therefor as the source computer and
transmits movement instructions for moving the session information, the session information destination decision unit deciding one or a plurality of computers having load values smaller than the target load values therefor as the destination computer.

16. A load balancing system according to claim 10, wherein
the computer is a virtual machine, and
the session information destination decision unit decides a virtual machine that is scaled out to be added newly in accordance with scaling out of the virtual machine as the destination computer.

17. A load balancing system according to claim 10, wherein
the processing response includes an HTTP response and the business processing unit stores the information for identifying the second computer in a Cookie area of the HTTP response to thereby produce the processing response containing the information for identifying the second computer.

18. A load balancing system according to claim 10, wherein
the computer constitutes a blade of a blade server and the plurality of computers constitute a blade server composed of a plurality of the blades.

* * * * *